(12) United States Patent
Giokas

(10) Patent No.: US 10,911,494 B2
(45) Date of Patent: Feb. 2, 2021

(54) METHODS AND SYSTEMS FOR PROVIDING SECURITY TO IOT DEVICES OPERATING IN AN ENVIRONMENT

(71) Applicant: Ioannis Giokas, New York, NY (US)

(72) Inventor: Ioannis Giokas, New York, NY (US)

( * ) Notice: Subject to any disclaimer, the term of this patent is extended or adjusted under 35 U.S.C. 154(b) by 359 days.

(21) Appl. No.: 16/058,761

(22) Filed: Aug. 8, 2018

(65) Prior Publication Data

US 2019/0052676 A1 Feb. 14, 2019

Related U.S. Application Data

(60) Provisional application No. 62/542,643, filed on Aug. 8, 2017.

(51) Int. Cl.
| | |
|---|---|
| *H04L 29/06* | (2006.01) |
| *H04L 29/08* | (2006.01) |
| *H04W 4/70* | (2018.01) |
| *H04W 12/08* | (2021.01) |

(52) U.S. Cl.
CPC ............ *H04L 63/20* (2013.01); *H04L 63/102* (2013.01); *H04L 63/1433* (2013.01); *H04L 63/1441* (2013.01); *H04L 63/205* (2013.01); *H04L 67/12* (2013.01); *H04W 4/70* (2018.02); *H04W 12/08* (2013.01); *H04L 63/0281* (2013.01)

(58) Field of Classification Search
CPC ....... H04L 63/20; H04L 63/205; H04L 63/18; H04L 63/14; H04L 63/1408; H04L 63/1416; H04L 63/1433; H04L 63/1441; H04L 63/16
See application file for complete search history.

(56) References Cited

U.S. PATENT DOCUMENTS 10,320,613 B1 * 6/2019 Cam-Winget .......... H04W 4/70

* cited by examiner

*Primary Examiner* — Edward Zee

(57) ABSTRACT

A method of providing security to IOT devices operating in an environment is disclosed. The method may include receiving, using a communication device, a plurality of security profiles associated with a plurality of IOT devices from at least one security database. Further, the method may include storing, using a storage device, the plurality of security profiles. Further, the method may include receiving, using the communication device, a plurality of identifiers associated with the plurality of IOT devices from a customer premises equipment. Further, the method may include retrieving, using the storage device, the plurality of security profiles associated with the plurality of IOT devices based on the plurality of identifiers. Further, the method may include and transmitting, using the communication device, the plurality of security profiles to the CPE.

9 Claims, 15 Drawing Sheets

US 10,911,494 B2

METHODS AND SYSTEMS FOR PROVIDING SECURITY TO IOT DEVICES OPERATING IN AN ENVIRONMENT

The current application claims a priority to the U.S. Provisional Patent application Ser. No. 62/542,643 filed on Aug. 8, 2017.

FIELD OF THE INVENTION

The present invention relates generally to data processing. More specifically, the present disclosure describes method sand systems for providing security to Internet of Things (IOT) devices operating in an environment.

BACKGROUND OF THE INVENTION

Individuals and corporations are adding smart devices to homes, offices or other locations, that are exposed to the Internet. These smart devices include IP Cameras, home automation devices, smart refrigerators, smart locks, and smart speakers powered by smart assistants. However, many of these smart devices lack security features and expose users, family members, colleagues and other people visiting these locations to hackers who may invade their privacy or steal their data.

Further, a number of solutions, such as VPN, Anti-Virus, IPS, Firewall, UTM, Anti-Malware, Application Control, and URL Filtering, are available that are able to solve parts of the security problem or in combination the problem itself. For example, if a connected location needs to be protected, then multiple expensive security appliances are required. Further, the users need to configure multiple appliances or get a managed service from third parties. Yet further, if a new device needs to be protected, then manual configuration needs to be done. Therefore, existing solutions are costly and require a lot of expertise and time to implement.

Therefore, there is a need for improved methods and systems to provide security to IOT devices operating in an environment that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method of providing security to IOT devices operating in an environment is disclosed. The method may include receiving, using a communication device, a plurality of security profiles associated with a plurality of IOT devices from at least one security database. Further, the method may include storing, using a storage device, the plurality of security profiles. Further, the method may include receiving, using the communication device, a plurality of identifiers associated with the plurality of IOT devices from a customer premises equipment (CPE). Further, the method may include retrieving, using the storage device, the plurality of security profiles associated with the plurality of IOT devices based on the plurality of identifiers. Further, the method may include and transmitting, using the communication device, the plurality of security profiles to the CPE. Further, the CPE may be configured to control communication between the plurality of IOT devices and an external communication network based on the plurality of security profiles.

Further, according to some embodiments, a system of providing security to IOT devices operating in an environment is also disclosed. The system may include a communication device configured for receiving a plurality of security profiles associated with a plurality of IOT devices from at least one security database, receiving a plurality of identifiers associated with the plurality of IOT devices from a customer premises equipment (CPE), and transmitting the plurality of security profiles to the CPE. Further, the CPE may be configured to control communication between the plurality of IOT devices and an external communication network based on the plurality of security profiles. Further, the system may include a storage device configured for storing the plurality of security profiles, and retrieving the plurality of security profiles associated with the plurality of IOT devices based on the plurality of identifiers.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
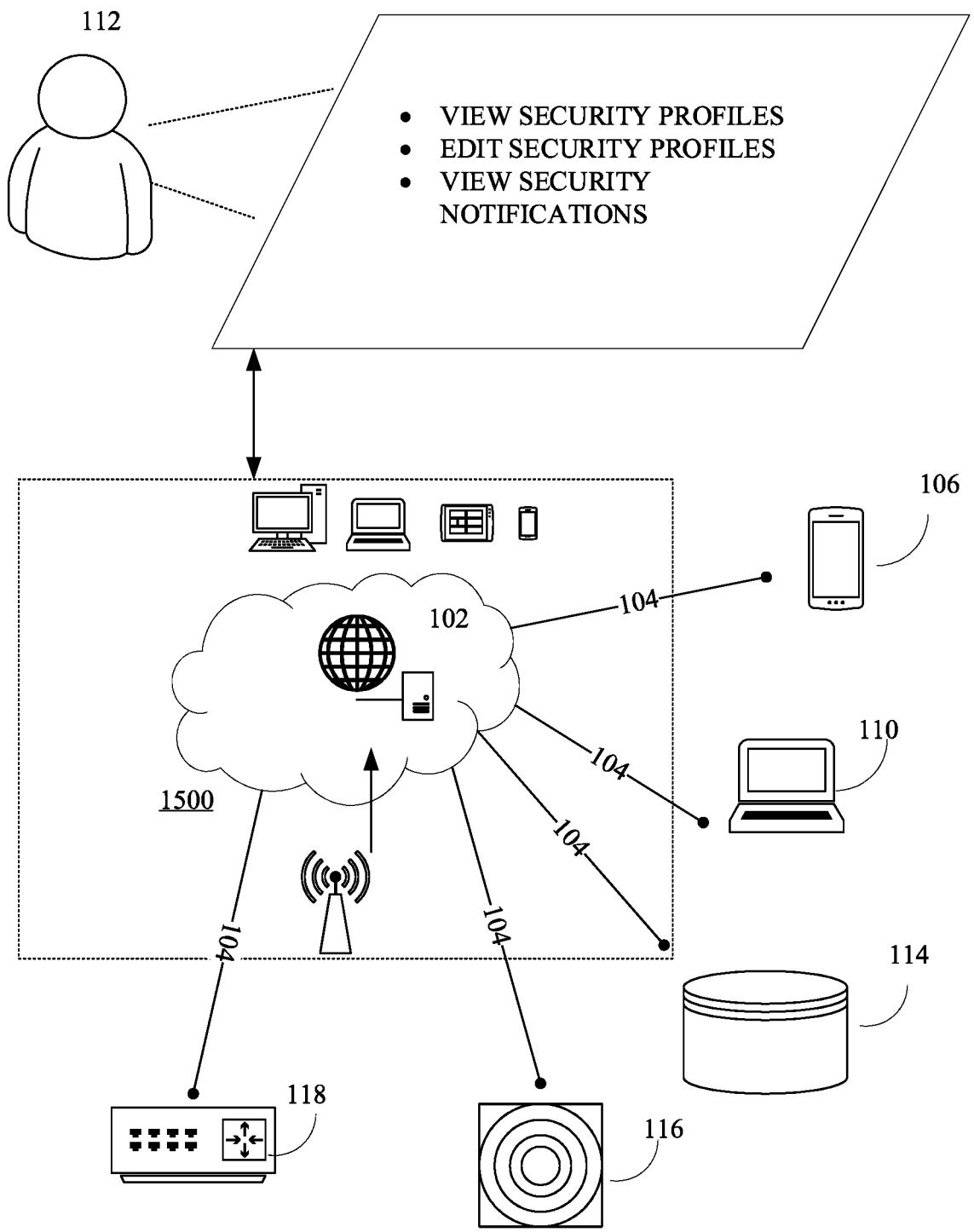
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of providing security to IOT devices operating in an environment, embodiments of the present disclosure are not limited to use only in this context.

FIG. 1 is an illustration of an online platform 100 consistent with various embodiments of the present disclosure. By way of non-limiting example, the online platform 100 to facilitate providing security to IOT devices operating in an environment may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114 (such as a security database, a website of manufacturer of an IOT device, etc.), sensors 116 (such as sensors included in one or more IOT devices), and an apparatus (such as a CPE) 118 over a communication network 104, such as, but not limited to, the Internet. Further, users of the online platform 100 may include relevant parties such as, but not limited to, end users, and administrators. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not limited to, a website, a web application, a desktop application, and a mobile application compatible with a computing device 1500.

According to some embodiments, the online platform 100 may be configured to facilitate providing security to IOT devices operating in an environment.

Figure 2:
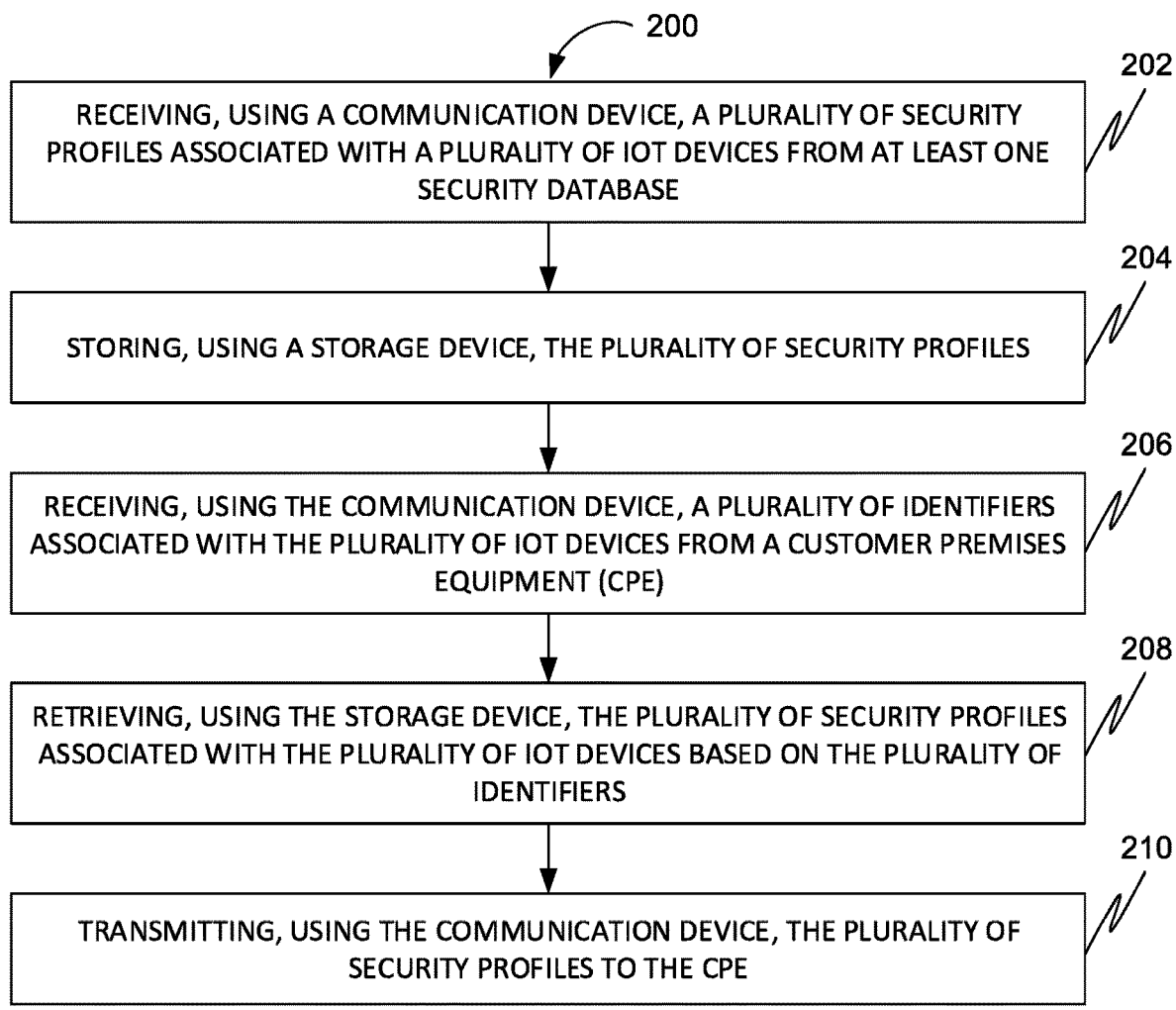
FIG. 2 shows a method of providing security to IOT devices operating in an environment, in accordance with some embodiments.

FIG. 2 shows a method 200 of providing security to IOT devices operating in an environment. In some embodiments, the method may be performed by an online platform, such as the online platform 100, or a server computer. In some embodiments, the method may be performed by a Customer Premises Equipment (CPE). In some other embodiments, the method may be performed by a network device such as an Internet Gateway configured to provide connectivity to a WLAN such as the Internet. In some other embodiments, the method may be performed by one or more IOT devices of a plurality of IOT devices operating in the environment. At 202, the method may include receiving, using a communication device, a plurality of security profiles associated with a plurality of IOT devices from at least one security database. The plurality of IOT devices may include vehicles, home appliances such as refrigerators, smart locks, and so on, that may inlcude embeded sensors, actuators, and other electronic components to connect and exchange data over a network. In general, a security profile of an IOT device may include any information based on which a communication stream associated with the IOT device may be controlled in order to ensure a secure operation of the IOT device. In some embodiments, the security profile may include information regarding one or more of a normal behavior and an abnormal behavior that may be determined based on an analysis of the communication stream. Further, in some embodiments, the security profile may include one or more characteristics of one or more other network devices with which the IOT device may or may not establish communication. For example, the security profile may include network addresses and/or MAC addresses of one or more network devices from which the IOT device may receive data and/or transmit data. As another example, the security profile may include one or more operational parameters and one or more values associated with the one or more operational parameters. The one or more operational parameters may in general dictate operation of the IOT device. For example, an operational parameter of the IOT device such as a motion sensor may include a frequency at which sensor data is transmitted to a designated network device. Accordingly, a value of the frequency that is specified may constitute a value corresponding to the operational parameter. Accordingly, one or more of the normal behavior and the abnormal behavior of the IOT device may be determined based on analysis of the one or more values of the one or more parameters as gleaned during performance of the method. For example, the security profile may indicate the frequency of transmission of the motion sensor to be at least once every 5 seconds. Accordingly, if no communication from the IOT device is received within a time frame of 5 seconds, the abnormal behavior may be detected. Further, in some embodiments, the one or more operational parameters and the one or more values may be associated with one or more contextual variables. The one or more contextual variables in general may indicate a context associated with the operation of the IOT device. For example, the one or more contextual variables may include time, location, motion state, environmental values (temperature, pressure, humidity, etc.) one or more device characteristics of one or more other IOT devices in the environment, one or more user characteristics associated with one or more users of one or more IOT devices, one or more network characteristics associated with a communication network over which the one or more IOT devices communicate and so on. Further, in an embodiment, the plurality of security profiles may include attribute-value sets, which may define one or more conditions for the IOT devices to transmit, and receive data. For instance, the attribute-value sets may corespond to one or more IP addresses to which the plurality of IOT devices may not transmit data, and may not receive data from. In some embodiments, an entity (such as the online platform, the CPE etc.) performing the steps of the method may communicate with one or more security databases that may provision the plurality of security profiles. In an instance, the one or more security databases may be hosted by third parties such as manufacturers of the plurality of IOT devices, security organizations (e.g. private security experts), standards organizations (e.g. NIST, IEEE etc.). Further, in an embodiment, a security database from which a security profile coresponding to an IOT device may be received may include a website of a manufacturer of the IOT device, where one or more security updates coresponding to the IOT device may be released. Further, the security database may include a security blog, which may release security updates coresponding to the plurality of IOT devices.

Further, at 204, the method may include storing, using a storage device, the plurality of security profiles. Accordingly, a copy of the plurality of security profiles may be created at an entity (such as the online platform, the CPE etc.) performing the steps of the method.

Further, at 206, the method may include receiving, using the communication device, a plurality of identifiers associated with the plurality of IOT devices from a customer premises equipment (CPE). In general, an identifier associated with an IOT device may include any information that may characterize the IOT device. In some embodiments, the identifier may uniquely identify the IOT device. For example, a global hardware address such as a MAC address associated with the IOT device may uniquely identify the IOT device. In some embodiments, the identifier may indicate a category to which the IOT device belongs along with one or more other IOT devices. For example, the identifier may include an IOT type indicator such as, IP camera. Further, in some embodiments, the identifier may also include a behavioral characteristic associated with the IOT device. For example, the identifier may include a pattern of receptions and/or transmissions associated with the IOT device. Further, in an embodiment, plurality of identifiers associated with the plurality of IOT devices may include names, names of manufacturers, and make and model numbers of the plurality of IOT devices. Further, the CPE may be a device that may be configured to monitor communication between the plurality of IOT devices and an external communication network. Further, at 208, the method may include retrieving, using the storage device, the plurality of security profiles associated with the plurality of IOT devices based on the plurality of identifiers. The plurality of identifiers, such as the names, names of manufacturers, and make and model numbers of the plurality of IOT devices may be used to identify a plurality of relevant security profiles corresponding to the plurality of IOT devices. Accordingly, the plurality of identifiers may be analyzed against the plurality of security profiles and the plurality of security profiles may be retrieved.

Further, at 210, the method may include transmitting, using the communication device, the plurality of security profiles to the CPE. Further, the CPE may be configured to control communication between the plurality of IOT devices and an external communication network based on the plurality of security profiles. In some embodiments, the CPE may function as a proxy to a network gateway (e.g. Internet modem). Accordingly, the CPE may be configured to receive communications from the plurality of IOT devices and selectively forward the communications to the network gateway. Similarly, the CPE may be configured to receive communications from the network gateway emanating from the external communication network such as the Internet and selectively forward it to one or more IOT devices of the plurality of IOT devices. Accordingly, in some embodiments, the CPE may be configured to spoof the network gateway address associated with the network gateway. Further, the network gateway address of the network gateway may be modified to prevent direct communication between the plurality of IOT devices and the network gateway. For instance, the CPE may be configured to analyze a plurality of communication streams corresponding to the plurality of IOT devices, and may be configured to perform a security operation based on the analyzing, such as blocking communication stream. In some embodiments, the external communication network may include the Internet.

Figure 3:
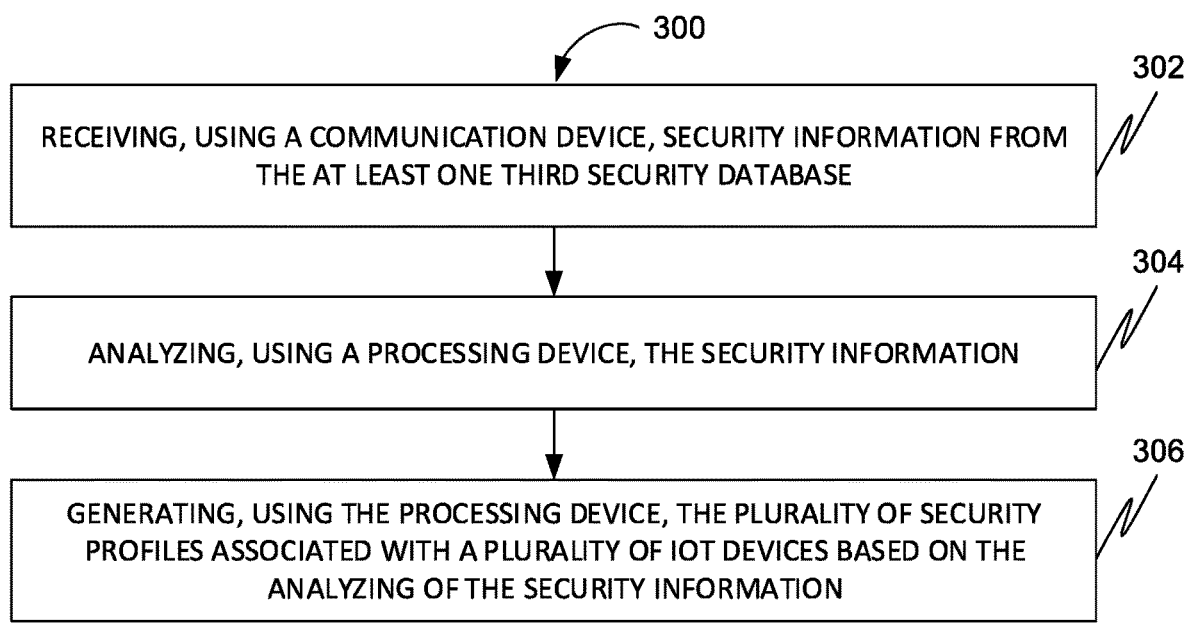
FIG. 3 shows a method of providing security to IOT devices operating in an environment, and generating security profiles based on security information, in accordance with some embodiments.

FIG. 3 shows a method 300 of providing security to IOT devices operating in an environment, and generating security profiles based on security information. At 302, the method may include receiving, using a communication device, security information from the at least one third security database. Security information may correspond to one or more of the plurality of IOT devices. In general, security information may be any information that may be relevant to secure operation of the plurality of IOT devices. In some embodiments, the security information may be in a form that may need analysis/transformation in order to derive the plurality of security profiles based on the security information. For example, the security information may be in a format different from a format of the plurality of security profiles. As another example, the security information may be in an unstructured form. For instance, one or more bug reports, security posts citing problems associated with one or more IOT devices, news articles indicating security vulnerabilities, press releases from security analysis companies, and so on. In some embodiments, security information may also include a log of historical data including one or more characteristics of one or more communication streams associated with one or more IOT devices, corresponding one or more security operations, corresponding one or more security responses. Further, security information may include details of anomalous behavior corresponding to one or more of the plurality of IOT devices, such as transmission of data to one or more unauthorized addresses, and blocking of transfer of data to or from one or more authorized addresses. Further, in an embodiment, anomalous behavior may include an unauthorized activation of one or more functions of one or more of the plurality of IOT devices, such as through of one or more sensors. For instance, if the IOT device is an IP camera, the anomalous behavior may include automatic activation of the IP camera during a time when the IP camera may have been turned off. Further, the third security database may include one or more platforms where security information corresponding to one or more of the plurality of IOT devices may be published. Accordingly, the third security database may include, but may not be limited to one or more of security blogs, discussion forums, complaint forums, and so on. Further, the security information may have been published or provided on the third security database in different manners, such as through one or more blogposts, one or more conversation threads, or through one or more forms. Further, at 304, the method may include analyzing, using a processing device, the security information. The analyzing may include determining one or more attribute-value sets corresponding to one or more of the plurality of the IOT devices leading to the anomalous behavior as described in the security information. Further, the analyzing may include determining one or more attribute-value sets corresponding to one or more of the plurality of the IOT devices that may need to be modified to eliminate the anomalous behavior as described in the security information. For instance, an attribute describing one or more blocked IP addresses may need to be modified to include additional IP addresses.

Further, at 306, the method may include generating, using the processing device, a plurality of security profiles associated with a plurality of IOT devices based on the analyzing of the security information. Accordingly, in some embodiments, the plurality of security profiles may be in a form that is readily consumable by the entity (e.g. online platform, CPE) performing the steps of the method. Further, the generating may include a creation of a plurality of attribute-value sets corresponding to the plurality of IOT devices. Further, the generating may include editing of a plurality of existing attribute-value sets corresponding to the plurality of IOT devices. For instance, an existing attribute-vale set corresponding to allowed IP addresses may be edited to remove an IP address corresponding to a malicious database.

Figure 4:
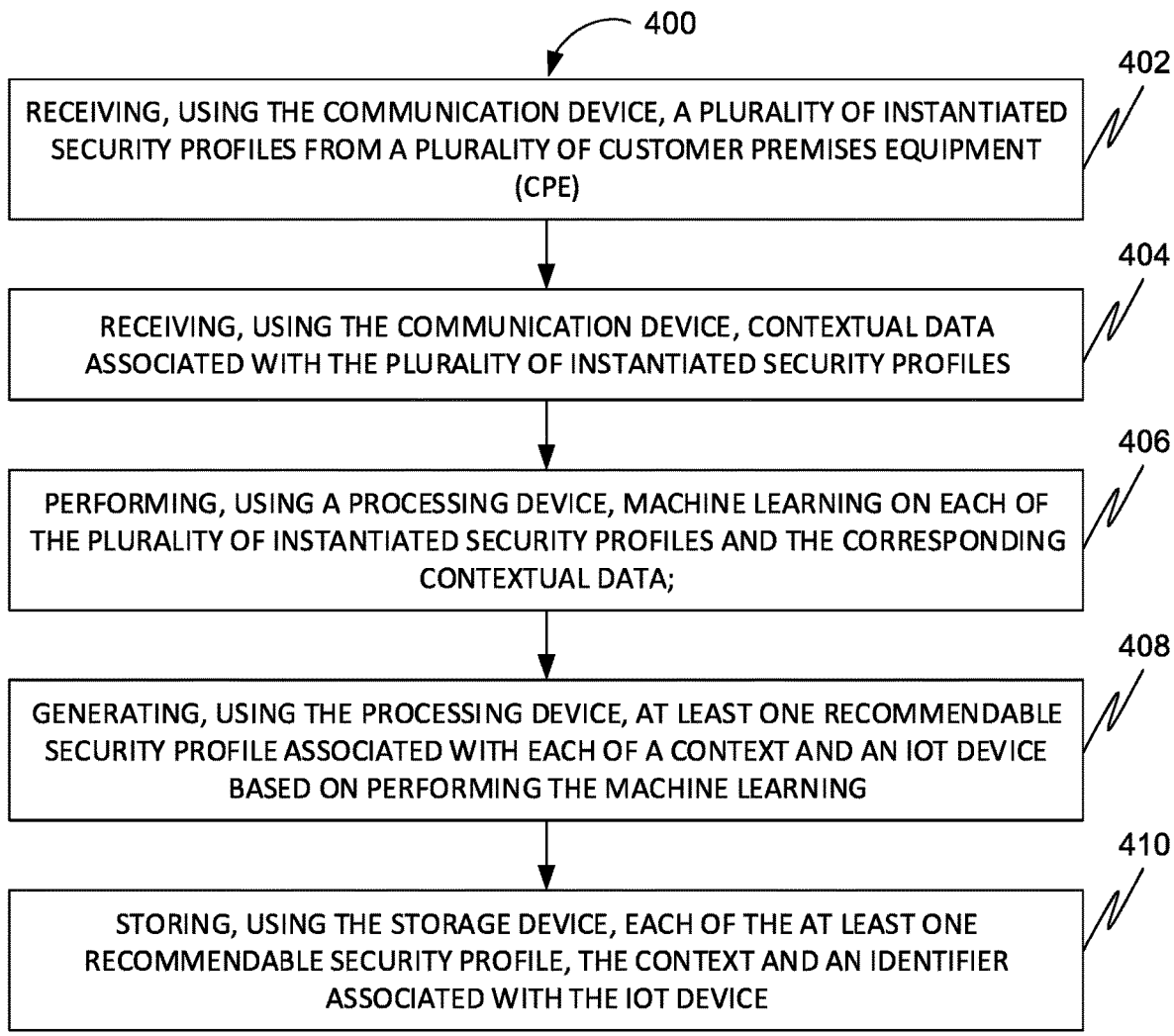
FIG. 4 shows a method of providing security to IOT devices operating in an environment, and generating reccomendable security profiles based on machine learning, in accordance with some embodiments.

FIG. 4 shows a method 400 of providing security to IOT devices operating in an environment, and generating reccomendable security profiles based on machine learning. At 402, the method may include receiving, using the communication device, a plurality of instantiated security profiles from a plurality of customer premises equipment (CPE). In general, an instantiated security profile associated with a CPE may include a security profile stored within the CPE based on which the CPE may control traffic between the plurality of IOT devices and the external communication network. In some embodiments, the instantiated security profile may be based on user actions associated with the operation of the CPE over a period of time. For instance, user actions may include configuration parameter values defined while configuring the plurality of IOT devices. Further, user actions may include allow or reject actions to one or more notifications corresponding to a security operation performed by the CPE device. Further, user actions may include confirmations, ignore actions, and so on to one or more notifications corresponding to a security operation performed by the CPE device. Further, in some embodiments, the instantiated security profiles may include the plurality of initial security profiles.

Further, the at 404, the method may include receiving, using the communication device, contextual data associated with the plurality of instantiated security profiles. Further, contextual data may comprise at least one security operation performed by the plurality of CPE based on the inspecting of a plurality of communication streams associated with the plurality of CPE. For instance, details about one or more incoming or outgoing communication streams that may have been blocked, or allowed by the plurality of CPE may be included in the communication stream. Accordingly, in some embodiments, based on one or more security operations that may have been performed in the past by one or more CPE, including transmission of notifications to one or more communication devices, may be considered in performing the machine learning. Further, contextual data may comprise at least one security response associated with the plurality of CPE. Accordingly, in some embodiments, based on one or more security responses that may have been performed in the past by one or more users may be considered in performing the machine learning. For instance, the one or more security responses may include allowing, or blocking of one or more communication streams based on a plurality of notifications transmitted by the plurality of CPE. Further, contextual data may comprise an indication of at least IOT device connected with the plurality of CPE.

Further, at 406, the method may include performing, using a processing device, machine learning on each of the plurality of instantiated security profiles and the corresponding contextual data. Further, the machine learning may include analyzing instantiated security profiles related to the plurality of IOT devices received from the plurality of CPE against the contextual data associated with the plurality of instantiated security profiles.

Further, at 408, the method may include generating, using the processing device, at least one recommendable security profile associated with each of a context and an IOT device based on performing the machine learning. Further, the generating of the at least recommendable security profile may include modifying the existing instantiated security profile based on, and by incorporating the contextual data. Further, the contextual data, such as security operation performed by the plurality of CPE based on the inspecting of a plurality of communication streams associated with the plurality of CPE may be used to generate at least one recommendable security profile. Accordingly, the security operation performed by the plurality of CPE may be set as a default operation in the context of the plurality of CPE. Further, a security response associated with the plurality of CPE may be used to define a default operation value in the context of the plurality of CPE.

Further, at 410, the method may include storing, using the storage device, each of the at least one recommendable security profile, the context and an identifier associated with the IOT device. Further, the plurality of security profiles may include the at least one recommendable security profile.

Figure 5:
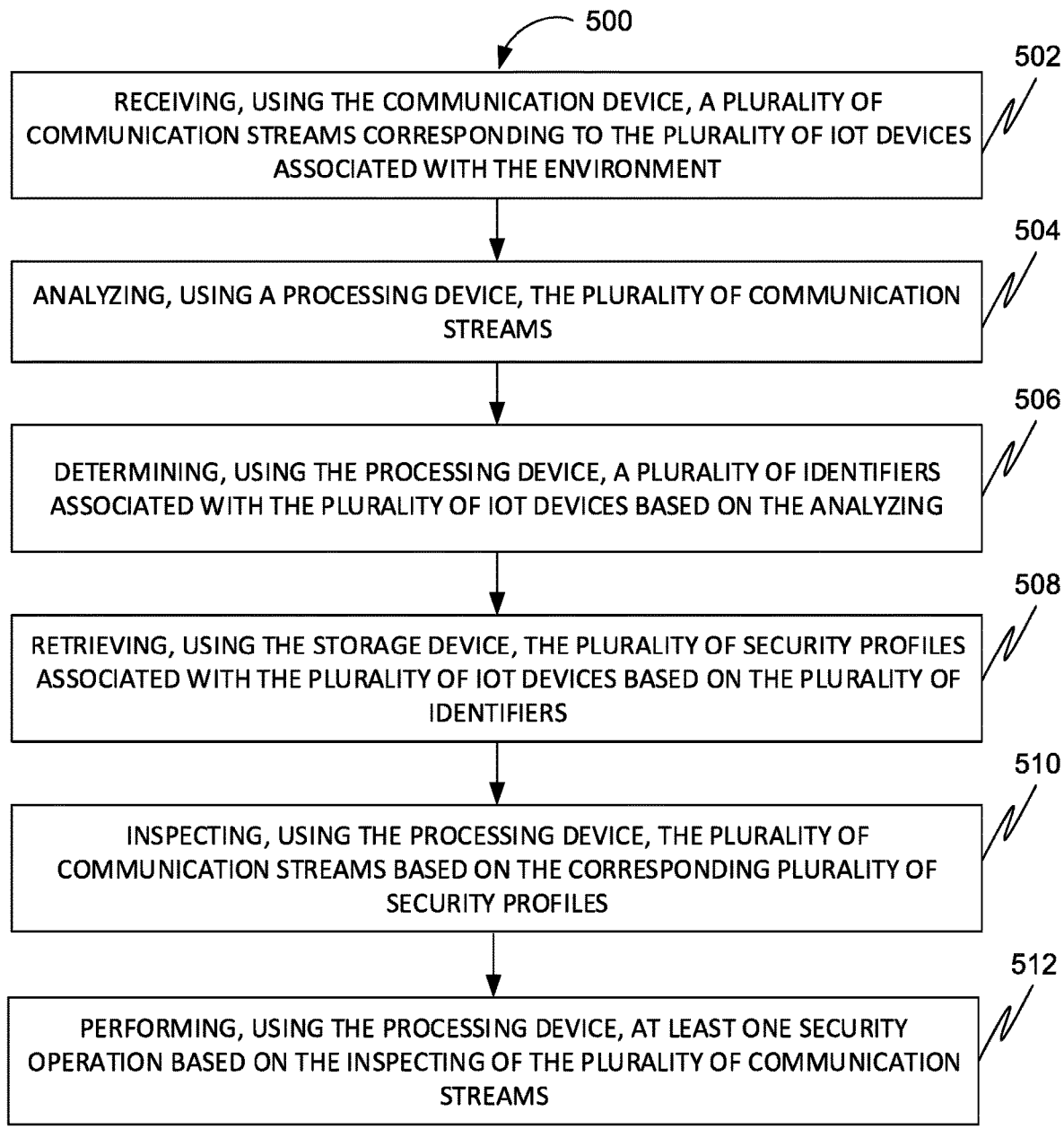
FIG. 5 shows a method of providing security to IOT devices operating in an environment, including receiving communication streams, and performing a security operation, in accordance with some embodiments.

FIG. 5 shows a method 500 of providing security to IOT devices operating in an environment, including receiving communication streams, and performing a security operation. Further, the steps of the may be performed by the online platform, such as the online platform 100, in one embodiment. In other words, in some embodiments, all communication (i.e. inbound and outbound) between the plurality of IOT devices and the external communication network may be passed through the online platform. Accordingly, the online platform may analyze communication emanating from the plurality of IOT devices in view of corresponding plurality of security profiles and accordingly perform one or more security actions (e.g. allow communication, block communication, quarantine communication until further confirmation from a user and/or expert and so on.) Accordingly, at 502, the method may include receiving, using the communication device, a plurality of communication streams corresponding to the plurality of IOT devices associated with the environment. The plurality of communication streams may include one or more data packets received over a local network connection. Further, the local network connection may include a Local Area Network (LAN), wherein the one or more communication streams may be transmitted over a wired network, such as through one or more Ethernet cables. Further, the local network connection may include a Wireless Local Area Network (WLAN), wherein the one or more communication streams may be transmitted over a wireless network, such as through one or more wireless routers, over a network such as Wi-Fi. Further, the communication streams may correspond to a plurality of IOT devices associated with an environment. The plurality of IOT devices may be configured to transmit data over a communication network, such as the internet. Accordingly, the plurality of IOT devices may be connected to the internet through an internet gateway. Further, the plurality of IOT devices may also be interconnected, and each of the plurality of IOT devices may share data with other connected IOT devices. Accordingly, the environment may correspond to the plurality of IOT devices connected over the local network connection.

Further, at 504, the method may include analyzing, using a processing device, the plurality of communication streams. Analyzing the plurality of communication streams may include identifying a plurality of data packets received from the plurality of IOT devices. Further, the identifying may include reading an associated header information of the plurality of data packets received from the plurality of IOT devices. The header information associated with the plurality of data packets may include a plurality of Mac addresses, a plurality of source IP addresses, and so on corresponding to a plurality of IOT devices. Further, the analyzing may include determining a number of the plurality of IOT devices associated with the local environment. Further, the identifying may include determining individual properties of the plurality of IOT devices, such as a plurality of Mac addresses and IP addresses corresponding to each of the plurality of IOT devices.

Further, at 506, the method may include determining, using the processing device, a plurality of identifiers associated with the plurality of IOT devices based on the analyzing. The plurality of identifiers associated with the plurality of IOT devices may include names, names of manufacturers, and make and model numbers of the plurality of IOT devices. Accordingly, the determining may include analyzing the individual properties of the plurality of IOT devices, and determining the plurality of identifiers associated with the plurality of IOT devices. For instance, the Mac numbers of the plurality of IOT devices may be analyzed and manufacturer names of the plurality of IOT devices may be determined. Further, the determining may include recognizing a category to which the plurality of IOT devices may belong. For instance, based on the analyzing, an IOT type indicator included in the identifier may be recognized, and the IOT type of an IOT device of the plurality of IOT devices may be determined to be IP camera.

Further, at 508, the method may include retrieving, using the storage device, the plurality of security profiles associated with the plurality of IOT devices based on the plurality of identifiers. Further, the plurality of security profiles associated with the plurality of IOT devices may be retrieved from at least one security database. Further, the at least one security database from which the plurality of security profiles associated with the plurality of IOT devices may be retrieved may include a plurality of websites of manufacturers of the plurality of IOT devices, where one or more security updates coresponding to the plurality IOT devices may be released. Further, the at least one security database may include a security blog, which may release security updates coresponding to the plurality of IOT devices. Further, retrieving may include analyzing plurality of identifiers received corresponding to the plurality of IOT devices. Accordingly, the plurality of security profiles associated with the plurality of IOT devices may be retrieved based on the plurality of identifiers, such as manufacturer name, make, model number, and so on. Further, the Further, the plurlity of security profiles may include attribute-value sets, which may define one or more conditions for the IOT devices to transmit, and receive data. For instance, the attribute-value sets may corespond to one or more IP addresses to which the plurality of IOT devices may not transmit data, and may not receive data from.

Further, at 510, the method may include inspecting, using the processing device, the plurality of communication streams based on the corresponding plurality of security profiles. Further, the inspecting may include scrutinizing the plurality of communication streams against the plurality of security profiles. For instance, the inspecting may include determining whether the plurality of IOT devices may be exhibiting abnormal behavior. Further, in an embodiment, the inspecting may include scrutinizing the plurality of communication streams against the set of attribute-value pairs included in the plurality of security profiles corresponding to the plurality of IOT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IOT devices and determining whether the one or more data packets may have been received from one or more IP addresses not included in a list of allowed IP addresses.

Further, at 512, the method may include performing, using the processing device, at least one security operation based on the inspecting of the plurality of communication streams. Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, a value of the time that may be specified as operational time of the IP camera may constitute a value corresponding to the operational parameter. Accordingly, if the IP camera is determined to be operational within a time that is not specified in the operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing, or blocking the anomalous behavior of the plurality of IOT devices.

Figure 6:
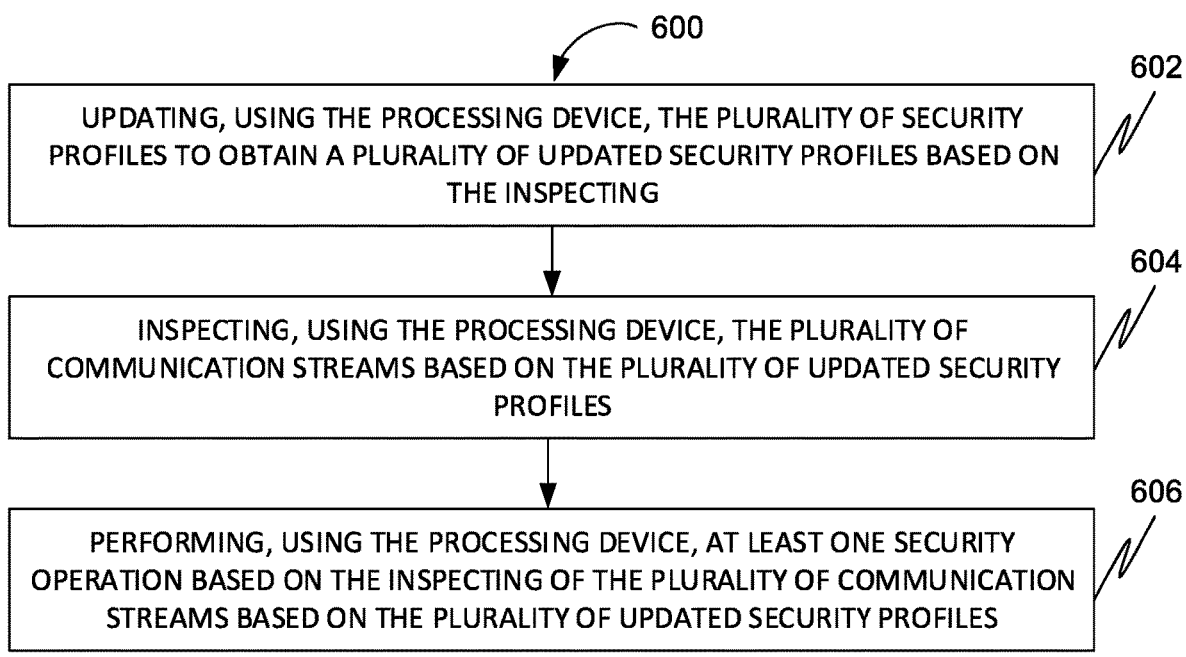
FIG. 6 shows a method of providing security to IOT devices operating in an environment, showing and updating security profiles corresponding to the IOT devices, in accordance with some embodiments.

FIG. 6 shows a method 600 of providing security to IOT devices operating in an environment, showing and updating security profiles corresponding to the IOT devices. At 602, the method may include updating, using the processing device, the plurality of security profiles to obtain a plurality of updated security profiles based on the inspecting. Further, the updating may include changing information based on which a communication stream associated with the IOT device may be controlled in order to ensure a secure operation of the IOT device. For instance, based on the inspecting, a list of defined normal behavior, or abnormal behavior may be updated. Further, in some embodiments, the plurality of security profiles may be modified to include one or more characteristics of one or more other network devices with which the IOT device may establish communication. As another example, the updated security profile may include one or more updated operational parameters and one or more additional, or fewer values associated with the one or more updated operational parameters. Further, in an embodiment, the plurality of updated security profiles may include additional or fewer attribute-value sets, which may define one or more conditions for the IOT devices to transmit, and receive data. For instance, the attribute-value sets may correspond to one or more IP addresses to which the plurality of IOT devices may not transmit data, and may not receive data from.

Further, at 604, the method may include inspecting, using the processing device, the plurality of communication streams based on the plurality of updated security profiles. Further, the inspecting may include scrutinizing the plurality of communication streams against the plurality of updated security profiles. For instance, the inspecting may include determining whether the plurality of IOT devices may be exhibiting abnormal behavior. Further, in an embodiment, the inspecting may include scrutinizing the plurality of communication streams against the set of updated attribute-value pairs included in the plurality of updated security profiles corresponding to the plurality of IOT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IOT devices and determining whether the one or more data packets may have been received from one or more IP addresses not included in a list of allowed IP addresses.

Further, at 606, the method may include performing, using the processing device, at least one security operation based on the inspecting of the plurality of communication streams based on the plurality of updated security profiles. Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing or blocking the anomalous behavior of the plurality of IOT devices.

Figure 7:
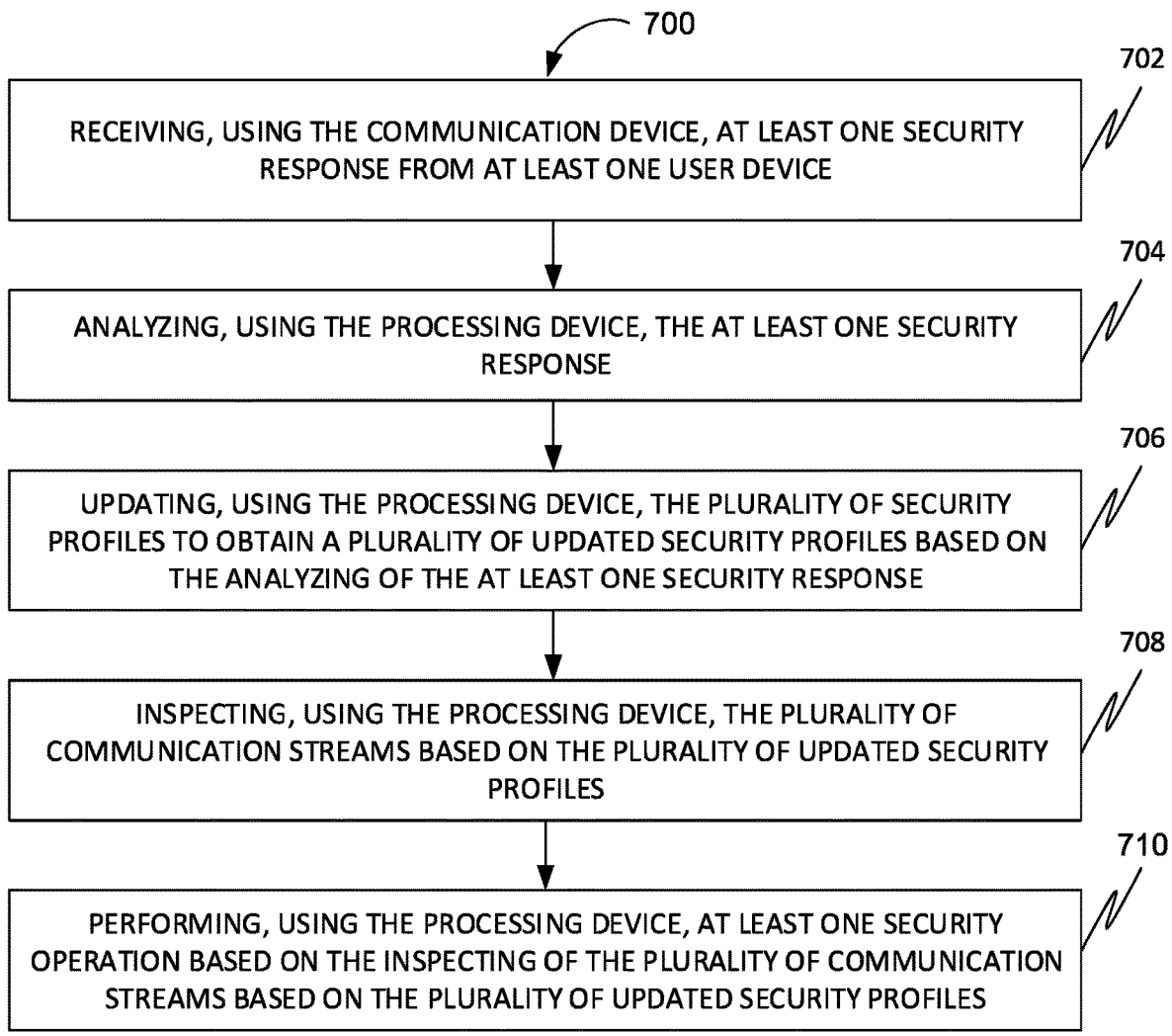
FIG. 7 shows a method of providing security to IOT devices operating in an environment, showing and updating security profiles corresponding to the IOT devices based on a security response, in accordance with some embodiments.

FIG. 7 shows a method 700 of providing security to IOT devices operating in an environment, showing and updating security profiles corresponding to the IOT devices based on a security response. At 702, the method may include receiving, using the communication device, at least one security response from at least one user device. Further, the at least one security response may correspond to at least one security operation based on inspecting of the plurality of communication streams. Further, the at least one security operation may include at least one security notification. Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include at least one security notification to a connected user device, such as a user device of an administrator of the environment, describing the anomalous behavior corresponding to one or more of the plurality of IOT devices.

Further, at 704, the method may include analyzing, using the processing device, the at least one security response. Further, the analyzing of the security response may include determining a user action on the security notification. Further, the user action on the security notification may include, but may not be limited to allow, block, accept, or reject a security operation included in the security notification. Further, the security response may reflect a user preference for the operation of the plurality of IOT devices.

Further, at 706, the method may include updating, using the processing device, the plurality of security profiles to obtain a plurality of updated security profiles based on the analyzing of the at least one security response. Further, the updating may include changing information based on which a communication stream associated with the IOT device may be controlled in order to ensure a secure operation of the IOT device. For instance, based on the inspecting, a list of defined normal behavior, or abnormal behavior may be updated. Further, in some embodiments, the plurality of security profiles may be modified to include one or more characteristics of one or more other network devices with which the IOT device may establish communication. As another example, the updated security profile may include one or more updated operational parameters and one or more additional, or fewer values associated with the one or more updated operational parameters. Further, in an embodiment, the plurality of updated security profiles may include additional or fewer attribute-value sets, which may define one or more conditions for the IOT devices to transmit, and receive data. For instance, the attribute-value sets may correspond to one or more IP addresses to which the plurality of IOT devices may not transmit data, and may not receive data from.

Further, at 708, the method may include inspecting, using the processing device, the plurality of communication streams based on the plurality of updated security profiles. Further, the inspecting may include scrutinizing the plurality of communication streams against the plurality of updated security profiles. For instance, the inspecting may include determining whether the plurality of IOT devices may be exhibiting abnormal behavior. Further, in an embodiment, the inspecting may include scrutinizing the plurality of communication streams against the set of updated attribute-value pairs included in the plurality of updated security profiles corresponding to the plurality of IOT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IOT devices and determining whether the one or more data packets may have been received from one or more IP addresses not included in a list of allowed IP addresses.

Further, at 710, the method may include performing, using the processing device, at least one security operation based on the inspecting of the plurality of communication streams based on the plurality of updated security profiles. Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing, or blocking the anomalous behavior of the plurality of IOT devices.

Figure 8:
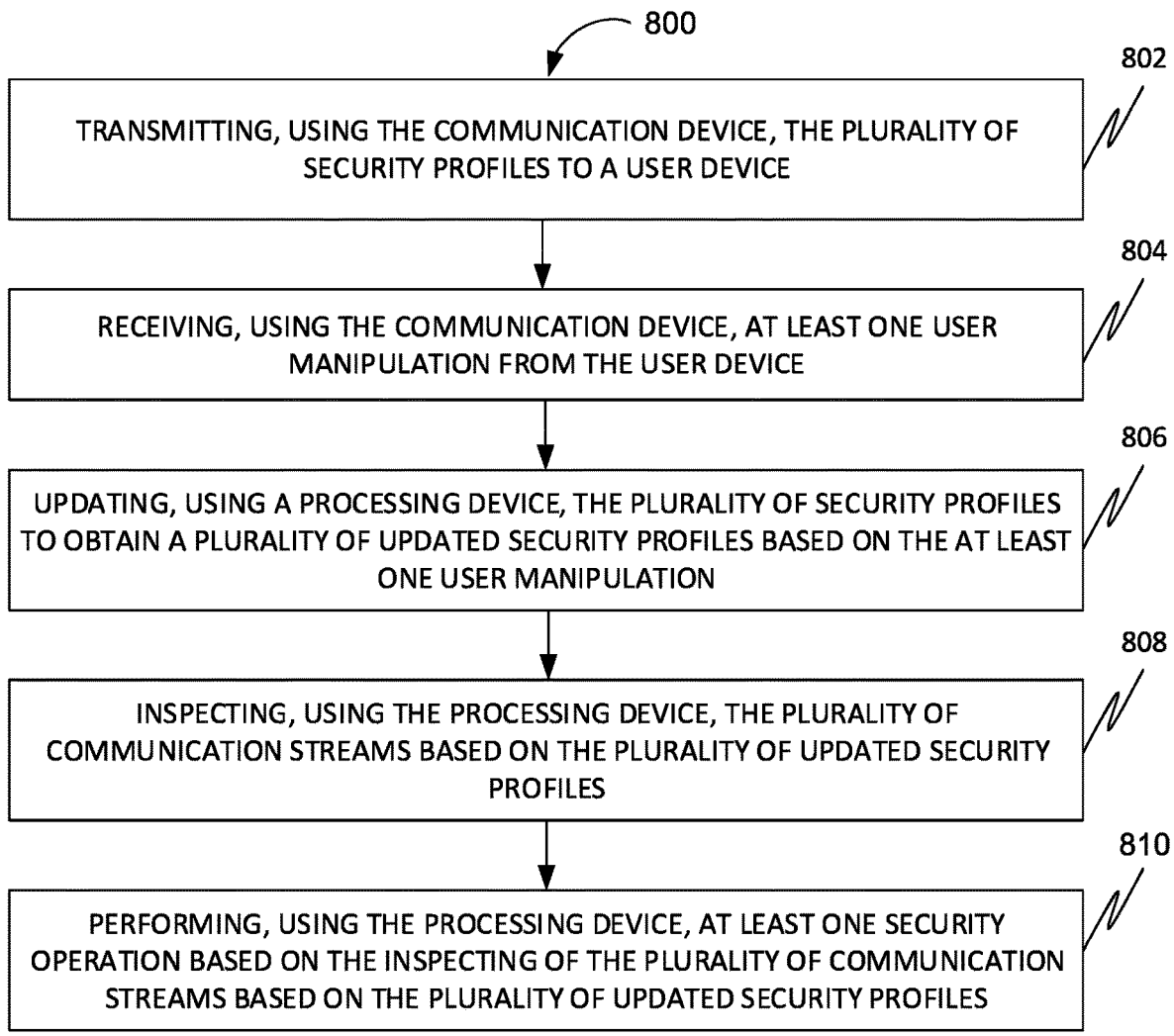
FIG. 8 shows a method of providing security to IOT devices operating in an environment, showing and updating security profiles corresponding to the IOT devices based on a user manipulation, in accordance with some embodiments.

FIG. 8 shows a method 800 of providing security to IOT devices operating in an environment, showing and updating security profiles corresponding to the IOT devices based on a user manipulation. At 802, the method may include transmitting, using the communication device, the plurality of security profiles to a user device. In general, a security profile of an IOT device may include any information based on which a communication stream associated with the IOT device may be controlled in order to ensure a secure operation of the IOT device. In some embodiments, the security profile may include information regarding one or more of a normal behavior and an abnormal behavior that may be determined based on an analysis of the communication stream.

Further, in some embodiments, the security profile may include one or more characteristics of one or more other network devices with which the IOT device may or may not establish communication. For example, the security profile may include network addresses and/or MAC addresses of one or more network devices from which the IOT device may receive data and/or transmit data. As another example, the security profile may include one or more operational parameters and one or more values associated with the one or more operational parameters. The one or more operational parameters may in general dictate operation of the IOT device. Further, in some embodiments, the one or more operational parameters and the one or more values may be associated with one or more contextual variables. The one or more contextual variables in general may indicate a context associated with the operation of the IOT device. For example, the one or more contextual variables may include time, location, motion state, environmental values (temperature, pressure, humidity, etc.) one or more device characteristics of one or more other IOT devices in the environment, one or more user characteristics associated with one or more users of one or more IOT devices, one or more network characteristics associated with a communication network over which the one or more IOT devices communicate and so on. Further, in an embodiment, the plurality of security profiles may include attribute-value sets, which may define one or more conditions for the IOT devices to transmit, and receive data. For instance, the attribute-value sets may corespond to one or more IP addresses to which the plurality of IOT devices may not transmit data, and may not receive data from.

Further, at 804, the method may include receiving, using the communication device, at least one user manipulation from the user device. Further, the at least one user manipulation may correspond to an update, addition, or deletion of information based on which a communication stream associated with the IOT device may be controlled in order to ensure a secure operation of the IOT device. Further, the at least one user manipulation may correspond to an update, addition, or deletion of one or more operational parameters and one or more values associated with the one or more operational parameters. Further, the at least one user manipulation may correspond to an update, addition, or deletion of one or more contextual variables associated with the one or more operational parameters and the one or more values.

Further, at 806, the method may include updating, using a processing device, the plurality of security profiles to obtain a plurality of updated security profiles based on the at least one user manipulation. Further, the updating may correspond to a change, addition, or deletion of information based on which a communication stream associated with the IOT device may be controlled in order to ensure a secure operation of the IOT device. Further, the updating may correspond to a change, addition, or deletion of one or more operational parameters and one or more values associated with the one or more operational parameters. Further, the at least one user manipulation may correspond to an update, addition, or deletion of one or more contextual variables associated with the one or more operational parameters and the one or more values.

Further, at 808, the method may include inspecting, using the processing device, the plurality of communication streams based on the plurality of updated security profiles. Further, the inspecting may include scrutinizing the plurality of communication streams against the plurality of updated security profiles. For instance, the inspecting may include determining whether the plurality of IOT devices may be exhibiting abnormal behavior. Further, in an embodiment, the inspecting may include scrutinizing the plurality of communication streams against the set of updated attribute-value pairs included in the plurality of updated security profiles corresponding to the plurality of IOT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IOT devices and determining whether the one or more data packets may have been received from one or more IP addresses not included in a list of allowed IP addresses.

Further, at 810, the method may include performing, using the processing device, at least one security operation based on the inspecting of the plurality of communication streams based on the plurality of updated security profiles. Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing, or blocking the anomalous behavior of the plurality of IOT devices.

Figure 9:
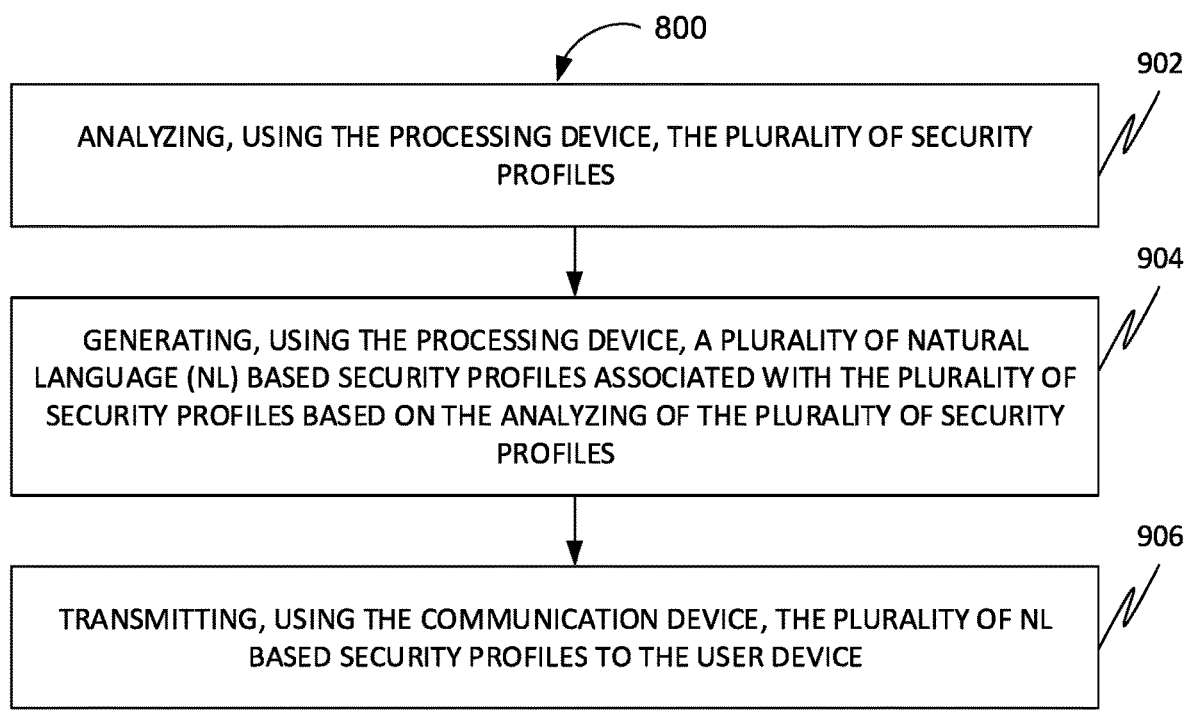
FIG. 9 shows a method of providing security to IOT devices operating in an environment, generating a natural language (NL) based security profiles associated with the plurality of security profiles, in accordance with some embodiments.

FIG. 9 shows a method 900 of providing security to IOT devices operating in an environment, generating a natural language (NL) based security profiles associated with the plurality of security profiles. AT 902, the method may include analyzing, using the processing device, the plurality of security profiles. In general, a security profile of an IOT device may include any information based on which a communication stream associated with the IOT device may be controlled in order to ensure a secure operation of the IOT device. In some embodiments, the security profile may include information regarding one or more of a normal behavior and an abnormal behavior that may be determined based on an analysis of the communication stream. Further, in some embodiments, the security profile may include one or more characteristics of one or more other network devices with which the IOT device may or may not establish communication. For example, the security profile may include network addresses and/or MAC addresses of one or more network devices from which the IOT device may receive data and/or transmit data. As another example, the security profile may include one or more operational parameters and one or more values associated with the one or more operational parameters. The one or more operational parameters may in general dictate operation of the IOT device. For example, an operational parameter of the IOT device such as a motion sensor may include a frequency at which sensor data is transmitted to a designated network device. Accordingly, a value of the frequency that is specified may constitute a value corresponding to the operational parameter. Accordingly, one or more of the normal behavior and the abnormal behavior of the IOT device may be determined based on analysis of the one or more values of the one or more parameters as gleaned during performance of the method. Accordingly, the analyzing may include determining any information based on which a communication stream associated with the IOT device may be controlled in order to ensure a secure operation of the IOT device, such as the normal behavior, and the abnormal behavior. Further, the analyzing may include determining the one or more operational parameters, and values of the one or more operational parameters.

Further, at 904, the method may include generating, using the processing device, a plurality of natural language (NL) based security profiles associated with the plurality of security profiles based on the analyzing of the plurality of security profiles. In general, the NL based security profile may indicate any form of a security profile that may be user friendly to comprehend and/or to specify. In some embodiments, the NL based security profile may include grammatically formed sentences in one or more languages in order to facilitate comprehension of the meaning and/or impact of the corresponding security profile. Further, in some embodiments, the NL based security profile may be based on commonly used terms as opposed to technical terms. Likewise, in some embodiments, the NL based security profile may be based on a literacy level associated with a user. In addition, in some embodiments, the NL based security profile may be based on a description that is more meaningful for the user. For example, as opposed to indicating network addresses in terms of numbers, meaningful descriptors such as home computer, office computer, hotel computer etc. may be used.

Further, at 906, the method may include transmitting, using the communication device, the plurality of NL based security profiles to the user device.

Further, according to some embodiments, a system, such as the system 1500 of providing security to IOT devices operating in an environment is also disclosed. The system may include a communication device such as input device(s) 1512, output device(s) 1514, and communication connections 1516 configured for receiving a plurality of security profiles associated with a plurality of IOT devices from at least one security database, receiving a plurality of identifiers associated with the plurality of IOT devices from a customer premises equipment (CPE), and transmitting the plurality of security profiles to the CPE. Further, the CPE may be configured to control communication between the plurality of IOT devices and an external communication network based on the plurality of security profiles. Further, the system may include a storage device, such as removable storage 1509, and non-removable storage 1510, configured for storing the plurality of security profiles, and retrieving the plurality of security profiles associated with the plurality of IOT devices based on the plurality of identifiers. The plurality of IOT devices may include vehicles, home appliances such as refrigerators, smart locks, and so on, that may include embedded sensors, actuators, and other electronic components to connect and exchange data over a network. In general, a security profile of an IOT device may include any information based on which a communication stream associated with the IOT device may be controlled in order to ensure a secure operation of the IOT device. In some embodiments, the security profile may include information regarding one or more of a normal behavior and an abnormal behavior that may be determined based on an analysis of the communication stream. Further, in some embodiments, the security profile may include one or more characteristics of one or more other network devices with which the IOT device may or may not establish communication. For example, the security profile may include network addresses and/or MAC addresses of one or more network devices from which the IOT device may receive data and/or transmit data. As another example, the security profile may include one or more operational parameters and one or more values associated with the one or more operational parameters. The one or more operational parameters may in general dictate operation of the IOT device. For example, an operational parameter of the IOT device such as a motion sensor may include a frequency at which sensor data is transmitted to a designated network device. Accordingly, a value of the frequency that is specified may constitute a value corresponding to the operational parameter. Accordingly, one or more of the normal behavior and the abnormal behavior of the IOT device may be determined based on analysis of the one or more values of the one or more parameters as gleaned during performance of the method. For example, the security profile may indicate the frequency of transmission of the motion sensor to be at least once every 5 seconds. Accordingly, if no communication from the IOT device is received within a time frame of 5 seconds, the abnormal behavior may be detected. Further, in some embodiments, the one or more operational parameters and the one or more values may be associated with one or more contextual variables. The one or more contextual variables, in general, may indicate a context associated with the operation of the IOT device. For example, the one or more contextual variables may include time, location, motion state, environmental values (temperature, pressure, humidity, etc.) one or more device characteristics of one or more other IOT devices in the environment, one or more user characteristics associated with one or more users of one or more IOT devices, one or more network characteristics associated with a communication network over which the one or more IOT devices communicate and so on. Further, in an embodiment, the plurality of security profiles may include attribute-value sets, which may define one or more conditions for the IOT devices to transmit, and receive data. For instance, the attribute-value sets may correspond to one or more IP addresses to which the plurality of IOT devices may not transmit data, and may not receive data from. In some embodiments, an entity (such as the online platform, the CPE etc.) performing the steps of the method may communicate with one or more security databases that may provision the plurality of security profiles. In an instance, the one or more security databases may be hosted by third parties such as manufacturers of the plurality of IOT devices, security organizations (e.g. private security experts), standards organizations (e.g. NIST, IEEE etc.). Further, in an embodiment, a security database from which a security profile corresponding to an IOT device may be received may include a website of a manufacturer of the IOT device, where one or more security updates corresponding to the IOT device may be released. Further, the security database may include a security blog, which may release security updates corresponding to the plurality of IOT devices.

Further, an identifier associated with an IOT device may include any information that may characterize the IOT device. In some embodiments, the identifier may uniquely identify the IOT device. For example, a global hardware address such as a MAC address associated with the IOT device may uniquely identify the IOT device. In some embodiments, the identifier may indicate a category to which the IOT device belongs along with one or more other IOT devices. For example, the identifier may include an IOT type indicator such as IP camera. Further, in some embodiments, the identifier may also include a behavioral characteristic associated with the IOT device. For example, the identifier may include a pattern of receptions and/or transmissions associated with the IOT device. Further, in an embodiment, plurality of identifiers associated with the plurality of IOT devices may include names, names of manufacturers, and make and model numbers of the plurality of IoT devices. Further, the CPE may be a device that may be configured to monitor communication between the plurality of IOT devices and an external communication network.

Further, the CPE may be configured to control communication between the plurality of IOT devices and an external communication network based on the plurality of security profiles. In some embodiments, the CPE may function as a proxy to a network gateway (e.g. Internet modem). Accordingly, the CPE may be configured to receive communications from the plurality of IOT devices and selectively forward the communications to the network gateway. Similarly, the CPE may be configured to receive communications from the network gateway emanating from the external communication network such as the Internet and selectively forward it to one or more IOT devices of the plurality of IOT devices. Accordingly, in some embodiments, the CPE may be configured to spoof the network gateway address associated with the network gateway. Further, the network gateway address of the network gateway may be modified to prevent direct communication between the plurality of IOT devices and the network gateway. For instance, the CPE may be configured to analyze a plurality of communication streams corresponding to the plurality of IOT devices, and may be configured to perform a security operation based on the analyzing, such as blocking communication stream. In some embodiments, the external communication network may include the Internet.

Further, in storing, a copy of the plurality of security profiles may be created at an entity (such as the CPE).

Further, in retrieving, the plurality of identifiers, such as the names, names of manufacturers, and make and model numbers of the plurality of IoT devices may be used to identify a plurality of relevant security profiles corresponding to the plurality of IOT devices. Accordingly, the plurality of identifiers may be analyzed against the plurality of security profiles and the plurality of security profiles may be retrieved.

In some embodiments, the communication device may be further configured for receiving security information from the at least one third security database. Further, the system may include a processing device, such as the processing unit 1510 configured for analyzing the security information and generating a plurality of security profiles associated with a plurality of IOT devices based on the analyzing of the security information. Security information may correspond to one or more of the plurality of IOT devices. In general, security information may be any information that may be relevant to secure operation of the plurality of IOT devices. In some embodiments, the security information may be in a form that may need analysis/transformation in order to derive the plurality of security profiles based on the security information. For example, the security information may be in a format different from a format of the plurality of security profiles. As another example, the security information may be in an unstructured form. For instance, one or more bug reports, security posts citing problems associated with one or more IOT devices, news articles indicating security vulnerabilities, press releases from security analysis companies, and so on. In some embodiments, security information may also include a log of historical data including one or more characteristics of one or more communication streams associated with one or more IOT devices, corresponding one or more security operations, corresponding one or more security responses. Further, security information may include details of anomalous behavior corresponding to one or more of the plurality of IOT devices, such as transmission of data to one or more unauthorized addresses, and blocking of transfer of data to or from one or more authorized addresses. Further, in an embodiment, anomalous behavior may include an unauthorized activation of one or more functions of one or more of the plurality of IOT devices, such as through of one or more sensors. For instance, if the IOT device is an IP camera, the anomalous behavior may include automatic activation of the IP camera during a time when the IP camera may have been turned off. Further, the third security database may include one or more platforms where security information corresponding to one or more of the plurality of IOT devices may be published. Accordingly, the third security database may include, but may not be limited to one or more of security blogs, discussion forums, complaint forums, and so on. Further, the security information may have been published or provided on the third security database in different manners, such as through one or more blog posts, one or more conversation threads, or through one or more forms.

The analyzing may include determining one or more attribute-value sets corresponding to one or more of the plurality of the IOT devices leading to the anomalous behavior as described in the security information. Further, the analyzing may include determining one or more attribute-value sets corresponding to one or more of the plurality of the IOT devices that may need to be modified to eliminate the anomalous behavior as described in the security information. For instance, an attribute describing one or more blocked IP addresses may need to be modified to include additional IP addresses.

Further, the generating may include a creation of a plurality of attribute-value sets corresponding to the plurality of IOT devices. Further, the generating may include editing of a plurality of existing attribute-value sets corresponding to the plurality of IOT devices. For instance, an existing attribute-value set corresponding to allowed IP addresses may be edited to remove an IP address corresponding to a malicious database.

In some embodiments, the communication device may be further configured for receiving a plurality of instantiated security profiles from a plurality of customer premises equipment (CPE), and receiving contextual data associated with the plurality of instantiated security profiles. Further, the system further may include a processing device configured for performing machine learning on each of the plurality of instantiated security profiles and the corresponding contextual data and generating at least one recommendable security profile associated with each of a context and an IOT device based on performing the machine learning. Further, the storage device may be configured for storing each of the at least one recommendable security profile, the context and an identifier associated with the IOT device. Further, the plurality of security profiles may include the at least one recommendable security profile. In some embodiments, the contextual data further may include at least one security operation performed by the plurality of CPE based on the inspecting of a plurality of communication streams associated with the plurality of CPE. In some embodiments, the contextual data further may include at least one security response associated with the plurality of CPE.

In general, an instantiated security profile associated with a CPE may include a security profile stored within the CPE based on which the CPE may control traffic between the plurality of IOT devices and the external communication network. In some embodiments, the instantiated security profile may be based on user actions associated with the operation of the CPE over a period of time. For instance, user actions may include configuration parameter values defined while configuring the plurality of IOT devices. Further, user actions may include allow or reject actions to one or more notifications corresponding to a security operation performed by the CPE device. Further, user actions may include confirmations, ignore actions, and so on to one or more notifications corresponding to a security operation performed by the CPE device. Further, in some embodiments, the instantiated security profiles may include the plurality of initial security profiles.

Further, contextual data may comprise at least one security operation performed by the plurality of CPE based on the inspecting of a plurality of communication streams associated with the plurality of CPE. For instance, details about one or more incoming or outgoing communication streams that may have been blocked, or allowed by the plurality of CPE may be included in the communication stream. Accordingly, in some embodiments, based on one or more security operations that may have been performed in the past by one or more CPE, including transmission of notifications to one or more communication devices, may be considered in performing the machine learning. Further, contextual data may comprise at least one security response associated with the plurality of CPE. Accordingly, in some embodiments, based on one or more security responses that may have been performed in the past by one or more users may be considered in performing the machine learning. For instance, the one or more security responses may include allowing or blocking of one or more communication streams based on a plurality of notifications transmitted by the plurality of CPE. Further, contextual data may comprise an indication of at least IOT device connected with the plurality of CPE.

Further, the machine learning may include analyzing instantiated security profiles related to the plurality of IOT devices received from the plurality of CPE against the contextual data associated with the plurality of instantiated security profiles.

Further, the generating of the at least recommendable security profile may include modifying the existing instantiated security profile based on, and by incorporating the contextual data. Further, the contextual data, such as security operation performed by the plurality of CPE based on the inspecting of a plurality of communication streams associated with the plurality of CPE may be used to generate at least one recommendable security profile. Accordingly, the security operation performed by the plurality of CPE may be set as a default operation in the context of the plurality of CPE. Further, a security response associated with the plurality of CPE may be used to define a default operation value in the context of the plurality of CPE.

In some embodiments, the communication device may be further configured for receiving a plurality of communication streams corresponding to the plurality of IOT devices associated with the environment. Further, the system may include a processing device configured for analyzing the plurality of communication streams, determining a plurality of identifiers associated with the plurality of IOT devices based on the analyzing, inspecting the plurality of communication streams based on the corresponding plurality of security profiles, and performing at least one security operation based on the inspecting of the plurality of communication streams. Further, the storage device may be configured for retrieving the plurality of security profiles associated with the plurality of IOT devices based on the plurality of identifiers.

The plurality of communication streams may include one or more data packets received over a local network connection. Further, the local network connection may include a Local Area Network (LAN), wherein the one or more communication streams may be transmitted over a wired network, such as through one or more Ethernet cables. Further, the local network connection may include a Wireless Local Area Network (WLAN), wherein the one or more communication streams may be transmitted over a wireless network, such as through one or more wireless routers, over a network such as Wi-Fi. Further, the communication streams may correspond to a plurality of IoT devices associated with an environment. The plurality of IoT devices may be configured to transmit data over a communication network, such as the internet. Accordingly, the plurality of IoT devices may be connected to the internet through an internet gateway. Further, the plurality of IoT devices may also be interconnected, and each of the plurality of IoT devices may share data with other connected IoT devices. Accordingly, the environment may correspond to the plurality of IoT devices connected over the local network connection.

Further, analyzing the plurality of communication streams may include identifying a plurality of data packets received from the plurality of IoT devices. Further, the identifying may include reading an associated header information of the plurality of data packets received from the plurality of IoT devices. The header information associated with the plurality of data packets may include a plurality of Mac addresses, a plurality of source IP addresses, and so on corresponding to a plurality of IoT devices. Further, the analyzing may include determining a number of the plurality of IoT devices associated with the local environment. Further, the identifying may include determining individual properties of the plurality of IoT devices, such as a plurality of Mac addresses and IP addresses corresponding to each of the plurality of IoT devices.

Further, the plurality of identifiers associated with the plurality of IoT devices may include names, names of manufacturers, and make and model numbers of the plurality of IoT devices. Accordingly, the determining may include analyzing the individual properties of the plurality of IoT devices, and determining the plurality of identifiers associated with the plurality of IoT devices. For instance, the Mac numbers of the plurality of IoT devices may be analyzed and manufacturer names of the plurality of IoT devices may be determined. Further, the determining may include recognizing a category to which the plurality of IOT devices may belong. For instance, based on the analyzing, an IOT type indicator included in the identifier may be recognized, and the IOT type of an IOT device of the plurality of IOT devices may be determined to be IP camera.

Further, the inspecting may include scrutinizing the plurality of communication streams against the plurality of security profiles. For instance, the inspecting may include determining whether the plurality of IOT devices may be exhibiting abnormal behavior. Further, in an embodiment, the inspecting may include scrutinizing the plurality of communication streams against the set of attribute-value pairs included in the plurality of security profiles corresponding to the plurality of IoT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IoT devices and determining whether the one or more data packets may have been received from one or more IP addresses not included in a list of allowed IP addresses.

Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, a value of the time that may be specified as operational time of the IP camera may constitute a value corresponding to the operational parameter. Accordingly, if the IP camera is determined to be operational within a time that is not specified in the operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing or blocking the anomalous behavior of the plurality of IOT devices.

Further, the retrieving may include retrieving the plurality of security profiles associated with the plurality of IOT devices from at least one security database. Further, the at least one security database from which the plurality of security profiles associated with the plurality of IOT devices may be retrieved may include a plurality of websites of manufacturers of the plurality of IOT devices, where one or more security updates corresponding to the plurality IOT devices may be released. Further, the at least one security database may include a security blog, which may release security updates corresponding to the plurality of IOT devices. Further, retrieving may include analyzing the plurality of identifiers received corresponding to the plurality of IoT devices. Accordingly, the plurality of security profiles associated with the plurality of IOT devices may be retrieved based on the plurality of identifiers, such as manufacturer name, make, model number, and so on. Further, the Further, the plurality of security profiles may include attribute-value sets, which may define one or more conditions for the IOT devices to transmit, and receive data. For instance, the attribute-value sets may correspond to one or more IP addresses to which the plurality of IOT devices may not transmit data, and may not receive data from.

In some embodiments, the processing device may be further configured for updating the plurality of security profiles to obtain a plurality of updated security profiles based on the inspecting, inspecting the plurality of communication streams based on the plurality of updated security profiles, and performing at least one security operation based on the inspecting of the plurality of communication streams based on the plurality of updated security profiles.

Further, the updating may include changing information based on which a communication stream associated with the IOT device may be controlled in order to ensure a secure operation of the IOT device. For instance, based on the inspecting, a list of defined normal behavior, or abnormal behavior may be updated. Further, in some embodiments, the updated security profile may be modified to include one or more characteristics of one or more other network devices with which the IOT device may establish communication. As another example, the updated security profile may include one or more updated operational parameters and one or more additional, or fewer values associated with the one or more updated operational parameters. Further, in an embodiment, the plurality of updated security profiles may include additional or fewer attribute-value sets, which may define one or more conditions for the IOT devices to transmit, and receive data. For instance, the attribute-value sets may correspond to one or more IP addresses to which the plurality of IOT devices may not transmit data, and may not receive data from.

Further, the inspecting may include scrutinizing the plurality of communication streams against the plurality of updated security profiles. For instance, the inspecting may include determining whether the plurality of IOT devices may be exhibiting abnormal behavior. Further, in an embodiment, the inspecting may include scrutinizing the plurality of communication streams against the set of updated attribute-value pairs included in the plurality of updated security profiles corresponding to the plurality of IoT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IoT devices and determining whether the one or more data packets may have been received from one or more IP addresses not included in a list of allowed IP addresses.

Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing or blocking the anomalous behavior of the plurality of IOT devices.

In some embodiments, the communication device may be further configured for receiving at least one security response from at least one user device. Further, the at least one security response may correspond to at least one security operation based on inspecting of the plurality of communication streams. Further, the at least one security operation may include at least one security notification. Further, the processing device may be configured for analyzing, the at least one security response, updating the plurality of security profiles to obtain a plurality of updated security profiles based on the analyzing of the at least one security response, inspecting the plurality of communication streams based on the plurality of updated security profiles, and performing at least one security operation based on the inspecting of the plurality of communication streams based on the plurality of updated security profiles.

Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include at least one security notification to a connected user device, such as a user device of an administrator of the environment, describing the anomalous behavior corresponding to one or more of the plurality of IOT devices.

Further, the analyzing of the security response may include determining a user action on the security notification. Further, the user action on the security notification may include, but may not be limited to allow, block, accept, or reject a security operation included in the security notification. Further, the security response may reflect a user preference for the operation of the plurality of IOT devices.

Further, the updating may include changing information based on which a communication stream associated with the IOT device may be controlled in order to ensure a secure operation of the IOT device. For instance, based on the inspecting, a list of defined normal behavior, or abnormal behavior may be updated. Further, in some embodiments, the updated security profile may be modified to include one or more characteristics of one or more other network devices with which the IOT device may establish communication. As another example, the updated security profile may include one or more updated operational parameters and one or more additional, or fewer values associated with the one or more updated operational parameters. Further, in an embodiment, the plurality of updated security profiles may include additional or fewer attribute-value sets, which may define one or more conditions for the IOT devices to transmit, and receive data. For instance, the attribute-value sets may correspond to one or more IP addresses to which the plurality of IOT devices may not transmit data, and may not receive data from.

Further, the inspecting may include scrutinizing the plurality of communication streams against the plurality of updated security profiles. For instance, the inspecting may include determining whether the plurality of IOT devices may be exhibiting abnormal behavior. Further, in an embodiment, the inspecting may include scrutinizing the plurality of communication streams against the set of updated attribute-value pairs included in the plurality of updated security profiles corresponding to the plurality of IoT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IoT devices and determining whether the one or more data packets may have been received from one or more IP addresses not included in a list of allowed IP addresses.

Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing or blocking the anomalous behavior of the plurality of IOT devices.

In some embodiments, the communication device may be further configured for transmitting the plurality of security profiles to a user device and receiving at least one user manipulation from the user device. Further, the system may include a processing device configured for updating the plurality of security profiles to obtain a plurality of updated security profiles based on the at least one user manipulation, inspecting the plurality of communication streams based on the plurality of updated security profiles, and performing at least one security operation based on the inspecting of the plurality of communication streams based on the plurality of updated security profiles.

In general, a security profile of an IOT device may include any information based on which a communication stream associated with the IOT device may be controlled in order to ensure a secure operation of the IOT device. In some embodiments, the security profile may include information regarding one or more of a normal behavior and an abnormal behavior that may be determined based on an analysis of the communication stream. Further, in some embodiments, the security profile may include one or more characteristics of one or more other network devices with which the IOT device may or may not establish communication. For example, the security profile may include network addresses and/or MAC addresses of one or more network devices from which the IOT device may receive data and/or transmit data. As another example, the security profile may include one or more operational parameters and one or more values associated with the one or more operational parameters. The one or more operational parameters may in general dictate operation of the IOT device. Further, in some embodiments, the one or more operational parameters and the one or more values may be associated with one or more contextual variables. The one or more contextual variables, in general, may indicate a context associated with the operation of the IOT device. For example, the one or more contextual variables may include time, location, motion state, environmental values (temperature, pressure, humidity, etc.) one or more device characteristics of one or more other IOT devices in the environment, one or more user characteristics associated with one or more users of one or more IOT devices, one or more network characteristics associated with a communication network over which the one or more IOT devices communicate and so on. Further, in an embodiment, the plurality of security profiles may include attribute-value sets, which may define one or more conditions for the IOT devices to transmit, and receive data. For instance, the attribute-value sets may correspond to one or more IP addresses to which the plurality of IOT devices may not transmit data, and may not receive data from.

Further, the at least one user manipulation may correspond to an update, addition, or deletion of information based on which a communication stream associated with the IOT device may be controlled in order to ensure a secure operation of the IOT device. Further, the at least one user manipulation may correspond to an update, addition, or deletion of one or more operational parameters and one or more values associated with the one or more operational parameters. Further, the at least one user manipulation may correspond to an update, addition, or deletion of one or more contextual variables associated with the one or more operational parameters and the one or more values.

Further, the updating may correspond to a change, addition, or deletion of information based on which a communication stream associated with the IOT device may be controlled in order to ensure a secure operation of the IOT device. Further, the updating may correspond to a change, addition, or deletion of one or more operational parameters and one or more values associated with the one or more operational parameters. Further, the at least one user manipulation may correspond to an update, addition, or deletion of one or more contextual variables associated with the one or more operational parameters and the one or more values.

Further, the inspecting may include scrutinizing the plurality of communication streams against the plurality of updated security profiles. For instance, the inspecting may include determining whether the plurality of IOT devices may be exhibiting abnormal behavior. Further, in an embodiment, the inspecting may include scrutinizing the plurality of communication streams against the set of updated attribute-value pairs included in the plurality of updated security profiles corresponding to the plurality of IoT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IoT devices and determining whether the one or more data packets may have been received from one or more IP addresses not included in a list of allowed IP addresses. Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing or blocking the anomalous behavior of the plurality of IOT devices.

In some embodiments, the processing device may be configured for analyzing the plurality of security profiles, and generating a plurality of natural language (NL) based security profiles associated with the plurality of security profiles based on the analyzing of the plurality of security profiles. Further, the communication device may be configured for transmitting the plurality of NL based security profiles to the user device. In general, a security profile of an IOT device may include any information based on which a communication stream associated with the IOT device may be controlled in order to ensure a secure operation of the IOT device. In some embodiments, the security profile may include information regarding one or more of a normal behavior and an abnormal behavior that may be determined based on an analysis of the communication stream.

Further, in some embodiments, the security profile may include one or more characteristics of one or more other network devices with which the IOT device may or may not establish communication. For example, the security profile may include network addresses and/or MAC addresses of one or more network devices from which the IOT device may receive data and/or transmit data. As another example, the security profile may include one or more operational parameters and one or more values associated with the one or more operational parameters. The one or more operational parameters may in general dictate operation of the IOT device. For example, an operational parameter of the IOT device such as a motion sensor may include a frequency at which sensor data is transmitted to a designated network device. Accordingly, a value of the frequency that is specified may constitute a value corresponding to the operational parameter. Accordingly, one or more of the normal behavior and the abnormal behavior of the IOT device may be determined based on analysis of the one or more values of the one or more parameters as gleaned during performance of the method. Accordingly, the analyzing may include determining any information based on which a communication stream associated with the IOT device may be controlled in order to ensure a secure operation of the IOT device, such as the normal behavior, and the abnormal behavior. Further, the analyzing may include determining the one or more operational parameters, and values of the one or more operational parameters.

In general, the NL based security profile may indicate any form of a security profile that may be user-friendly to comprehend and/or to specify. In some embodiments, the NL based security profile may include grammatically formed sentences in one or more languages in order to facilitate comprehension of the meaning and/or impact of the corresponding security profile. Further, in some embodiments, the NL based security profile may be based on commonly used terms as opposed to technical terms. Likewise, in some embodiments, the NL based security profile may be based on a literacy level associated with a user. In addition, in some embodiments, the NL based security profile may be based on a description that is more meaningful for the user. For example, as opposed to indicating network addresses in terms of numbers, meaningful descriptors such as home computer, office computer, hotel computer etc. may be used.

Figure 10:
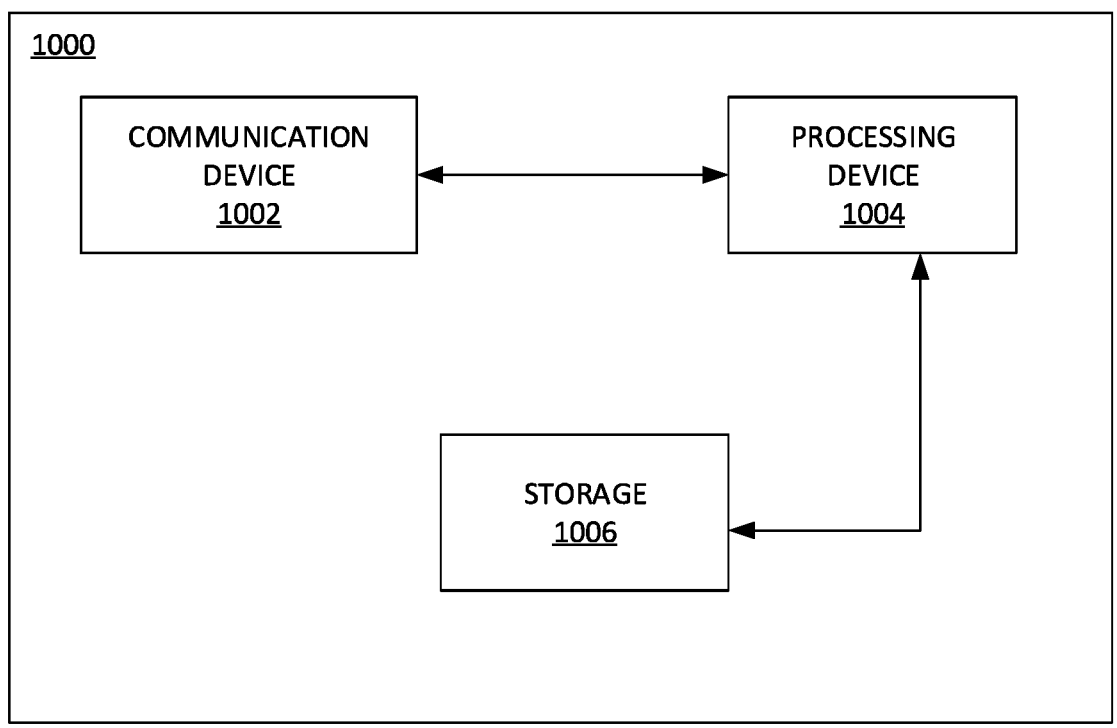
FIG. 10 shows a Customer Premises Equipment (CPE) for providing security to IOT devices operating in an environment, in accordance with some embodiments.

Further, a Customer Premises Equipment (CPE) 1000 (as illustrated in FIG. 10) for providing security to IOT devices operating in an environment is also disclosed.

The CPE may include a communication device 1002 configured for receiving a plurality of communication streams corresponding to a plurality of IOT devices associated with the environment, transmitting a plurality of identifiers to a remote computing device, and receiving a plurality of initial security profiles corresponding to the plurality of IOT devices. Further, the remote computing device may be configured to determine the plurality of initial security profiles based on the plurality of identifiers. Further the CPE may include a processing device 1004 configured for, analyzing the plurality of communication streams, determining the plurality of identifiers associated with the plurality of IOT devices based on the analyzing, inspecting the plurality of communication streams based on the corresponding plurality of initial security profiles, and performing at least one security operation based on the inspecting of the plurality of communication streams. Further, the CPE may include a storage device 1006 configured for storing the plurality of initial security profiles.

Further, the plurality of communication streams may include one or more data packets received over a local network connection. Further, the local network connection may include a Local Area Network (LAN), wherein the one or more communication streams may be transmitted over a wired network, such as through one or more Ethernet cables. Further, the local network connection may include a Wireless Local Area Network (WLAN), wherein the one or more communication streams may be transmitted over a wireless network, such as through one or more wireless routers, over a network such as Wi-Fi. Further, the communication streams may correspond to a plurality of IoT devices associated with an environment. The plurality of IoT devices may be configured to transmit data over a communication network, such as the internet. Accordingly, the plurality of IoT devices may be connected to the internet through an internet gateway. Further, the plurality of IoT devices may also be interconnected, and each of the plurality of IoT devices may share data with other connected IoT devices. Accordingly, the environment may correspond to the plurality of IoT devices connected over the local network connection.

Further, the transmitting of the plurality of identifiers to the remote computing device may be performed through a secure tunnel, such as VPN. Further, a secure tunnel initiation engine corresponding to the CPE may connect to a secure tunnel termination engine corresponding to the remote computing device to facilitate the transmitting.

In general, an initial security profile of an IOT device may include information based on which a communication stream associated with the IOT device may be controlled in order to ensure a secure operation of the IOT device. In some embodiments, the security profile may include information regarding one or more of a normal behavior and an abnormal behavior that may be determined based on an analysis of the communication stream. Further, in some embodiments, the initial security profile may include one or more characteristics of one or more other network devices with which the IOT device may or may not establish communication. For example, the security profile may include network addresses and/or MAC addresses of one or more network devices from which the IOT device may receive data and/or transmit data. As another example, the initial security profile may include one or more operational parameters and one or more values associated with the one or more operational parameters. The one or more operational parameters may in general dictate operation of the IOT device. Further, in some embodiments, the one or more operational parameters and the one or more values may be associated with one or more contextual variables. The one or more contextual variables, in general, may indicate a context associated with the operation of the IOT device. For example, the one or more contextual variables may include time, location, motion state, environmental values (temperature, pressure, humidity, etc.) one or more device characteristics of one or more other IOT devices in the environment, one or more user characteristics associated with one or more users of one or more IOT devices, one or more network characteristics associated with a communication network over which the one or more IOT devices communicate and so on. Further, the plurality of initial security profiles associated with the plurality of IOT devices may be received from the remote computing device on the basis of the one or more identifiers associated with the plurality of IOT devices. Further, the remote computing device may be configured to analyze the plurality of identifiers, retrieve the plurality of initial security profiles the based on the plurality of identifiers, such as manufacturer name, make, model number, and so on, and transmit the plurality of initial security profiles.

Further, the analyzing the plurality of communication streams may include identifying a plurality of data packets received from the plurality of IoT devices. Further, the identifying may include reading an associated header information of the plurality of data packets received from the plurality of IoT devices. The header information associated with the plurality of data packets may include a plurality of Mac addresses, a plurality of source IP addresses, and so on corresponding to a plurality of IoT devices. Further, the analyzing may include determining a number of the plurality of IoT devices associated with the local environment. Further, the identifying may include determining individual properties of the plurality of IoT devices, such as a plurality of Mac addresses and IP addresses corresponding to each of the plurality of IoT devices.

The plurality of identifiers associated with the plurality of IoT devices may include names, names of manufacturers, and make and model numbers of the plurality of IoT devices. Accordingly, the determining may include analyzing the individual properties of the plurality of IoT devices, and determining the plurality of identifiers associated with the plurality of IoT devices. For instance, the Mac numbers of the plurality of IoT devices may be analyzed and manufacturer names of the plurality of IoT devices may be determined. Further, the determining may include recognizing a category to which the plurality of IOT devices may belong. For instance, based on the analyzing, an IOT type indicator included in the identifier may be recognized, and the IOT type of an IOT device of the plurality of IOT devices may be determined to be an IP camera.

Further, the inspecting may include scrutinizing the plurality of communication streams against the plurality of security profiles. For instance, the inspecting may include determining whether the plurality of IOT devices may be exhibiting abnormal behavior. Further, in an embodiment, the inspecting may include scrutinizing the plurality of communication streams against the set of attribute-value pairs included in the plurality of security profiles corresponding to the plurality of IoT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IoT devices and determining whether the one or more data packets may have been received from one or more IP addresses not included in a list of allowed IP addresses.

Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, a value of the time that may be specified as operational time of the IP camera may constitute a value corresponding to the operational parameter. Accordingly, if the IP camera is determined to be operational within a time that is not specified in the operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing or blocking the anomalous behavior of the plurality of IOT devices.

In some embodiments, the processing device 1004 may be further configured for updating the plurality of initial security profiles to obtain a plurality of updated security profiles based on the inspecting, inspecting the plurality of communication streams based on the plurality of updated security profiles, and performing at least one security operation based on the inspecting of the plurality of communication streams based on the plurality of updated security profiles.

Further, the updating may include changing information based on which a communication stream associated with the IOT device may be controlled in order to ensure a secure operation of the IOT device. For instance, based on the inspecting, a list of defined normal behavior or abnormal behavior may be updated. Further, in some embodiments, the plurality of initial security profiles may be modified to include one or more characteristics of one or more other network devices with which the IOT device may establish communication. As another example, the updated security profile may include one or more updated operational parameters and one or more additional, or fewer values associated with the one or more updated operational parameters. Further, in an embodiment, the plurality of updated security profiles may include additional or fewer attribute-value sets, which may define one or more conditions for the IOT devices to transmit, and receive data. For instance, the attribute-value sets may correspond to one or more IP addresses to which the plurality of IOT devices may not transmit data, and may not receive data from.

Further, the inspecting may include scrutinizing the plurality of communication streams against the plurality of updated security profiles. For instance, the inspecting may include determining whether the plurality of IOT devices may be exhibiting abnormal behavior. Further, in an embodiment, the inspecting may include scrutinizing the plurality of communication streams against the set of updated attribute-value pairs included in the plurality of updated security profiles corresponding to the plurality of IoT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IoT devices and determining whether the one or more data packets may have been received from one or more IP addresses not included in a list of allowed IP addresses.

Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing or blocking the anomalous behavior of the plurality of IOT devices.

In some embodiments, the communication device 1002 may be further configured for receiving at least one security response from at least one user device. Further, the at least one security response may correspond to the at least one security operation. Further, the at least one security operation may include at least one security notification. Further, the processing device 1004 may be configured for analyzing the at least one security response, updating the plurality of initial security profiles to obtain a plurality of updated security profiles based on the analyzing of the at least one security response, inspecting the plurality of communication streams based on the plurality of updated security profiles, and performing at least one security operation based on the inspecting of the plurality of communication streams based on the plurality of updated security profiles.

Further, the at least one security response may correspond to at least one security operation based on inspecting of the plurality of communication streams. Further, the at least one security operation may include at least one security notification. Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include at least one security notification to a connected user device, such as a user device of an administrator of the environment, describing the anomalous behavior corresponding to one or more of the plurality of IOT devices.

Further, the analyzing of the security response may include determining a user action on the security notification. Further, the user action on the security notification may include, but may not be limited to allow, block, accept, or reject a security operation included in the security notification. Further, the security response may reflect a user preference for the operation of the plurality of IOT devices.

Further, the updating may include changing information based on which a communication stream associated with the IOT device may be controlled in order to ensure a secure operation of the IOT device. For instance, based on the inspecting, a list of defined normal behavior or abnormal behavior may be updated. Further, in some embodiments, the plurality of initial security profile may be modified to include one or more characteristics of one or more other network devices with which the IOT device may establish communication. As another example, the plurality of updated security profiles may include one or more updated operational parameters and one or more additional, or fewer values associated with the one or more updated operational parameters. Further, in an embodiment, the plurality of updated security profiles may include additional or fewer attribute-value sets, which may define one or more conditions for the IOT devices to transmit, and receive data. For instance, the attribute-value sets may correspond to one or more IP addresses to which the plurality of IOT devices may not transmit data, and may not receive data from.

Further, the inspecting may include scrutinizing the plurality of communication streams against the plurality of updated security profiles. For instance, the inspecting may include determining whether the plurality of IOT devices may be exhibiting abnormal behavior. Further, in an embodiment, the inspecting may include scrutinizing the plurality of communication streams against the set of updated attribute-value pairs included in the plurality of updated security profiles corresponding to the plurality of IoT devices. Further, inspecting may include reading the headers of the plurality of data packets in the communication streams and determining whether one or more of the plurality of data packets may be directed towards one or more IP addresses that may have been blocked. Further, inspecting may include reading the headers of the plurality of data packets in one or more incoming communication streams directed towards one or more of the plurality of IoT devices and determining whether the one or more data packets may have been received from one or more IP addresses not included in a list of allowed IP addresses. Further, the at least one security operation may include an operation to regulate the working of the plurality of IOT devices in order to ensure a secure operation of the plurality of IOT devices. For example, an operational parameter of the IOT device such as an IP camera may include time for which the IP camera may be designated to operate and record. Accordingly, an updated value of the time that may be specified as operational time of the IP camera may constitute a value corresponding to the updated operational parameter. Accordingly, if the IP camera is determined to be operational within a time that is not specified in the updated operational time, the IP camera may be disabled as a security operation. Further, the at least one security operation may include transmission of a notification to a connected user device, such as a user device of an administrator of the environment, describing the anomalous behavior corresponding to one or more of the plurality of IOT devices. Further, the at least one security operation may include receiving an actionable input from the user device, such as allowing or blocking the anomalous behavior of the plurality of IOT devices.

Figure 11:
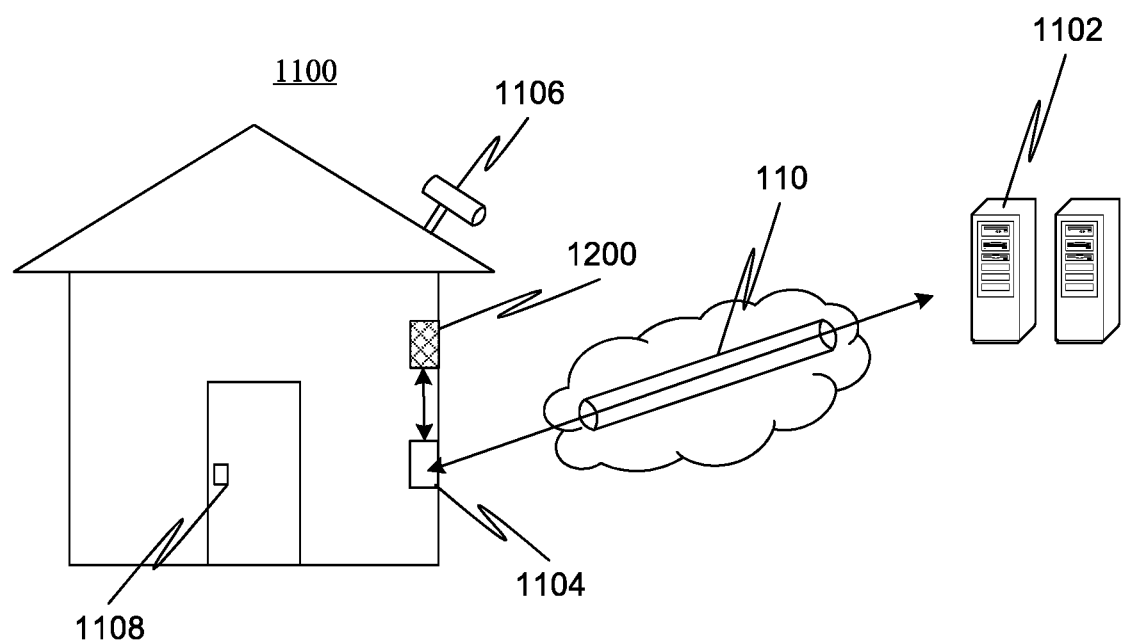
FIG. 11 is a block diagram of a system for securing IOT devices in accordance with various embodiments of the present disclosure, in accordance with some embodiments.

FIG. 11 is a block diagram of a system 1100 for securing IOT devices in accordance with various embodiments of the present disclosure. The system 1100 may include a security device 1200 installed at a location such as a home or an office building. The security device is explained in further detail in conjunction with FIG. 12. Further, the system 1100 may include a cloud infrastructure that may host a secure cloud 1102. The security device 1200 may be an electronic communication device. The security device 1200 may plug on to a Customer Premises Equipment (CPE) 1104 provided by an Internet Service Provider (ISP), such as Verizon™ and Comcast™. The security device 1200 may connect with the CPE 1104 automatically. Further, the security device 1200 may scans the location and may identify one or more IOT devices nearby. For example, the security device 1200 may detect an IP 1106 camera and a smart lock 1108 installed on the front door. The security device 1200 may connect automatically with the secure cloud 1102 with zero touches over a secure tunnel 1110 such as VPN. The secure cloud 1102 may constantly evolve and learn from actions of one or more users of the IOT devices such as the IP camera 1106 and the smart lock 1108 smart, and various security feeds, and may constantly optimize security profiles associated with the security device 1200. The security device 1200 may share information about the one or more IOT devices with the secure cloud 1102. Then, the secure cloud 1102 may automatically apply the relevant security profiles so as to securely connect the one or more IOT devices to an eternal network, such as the Internet.

Figure 12:
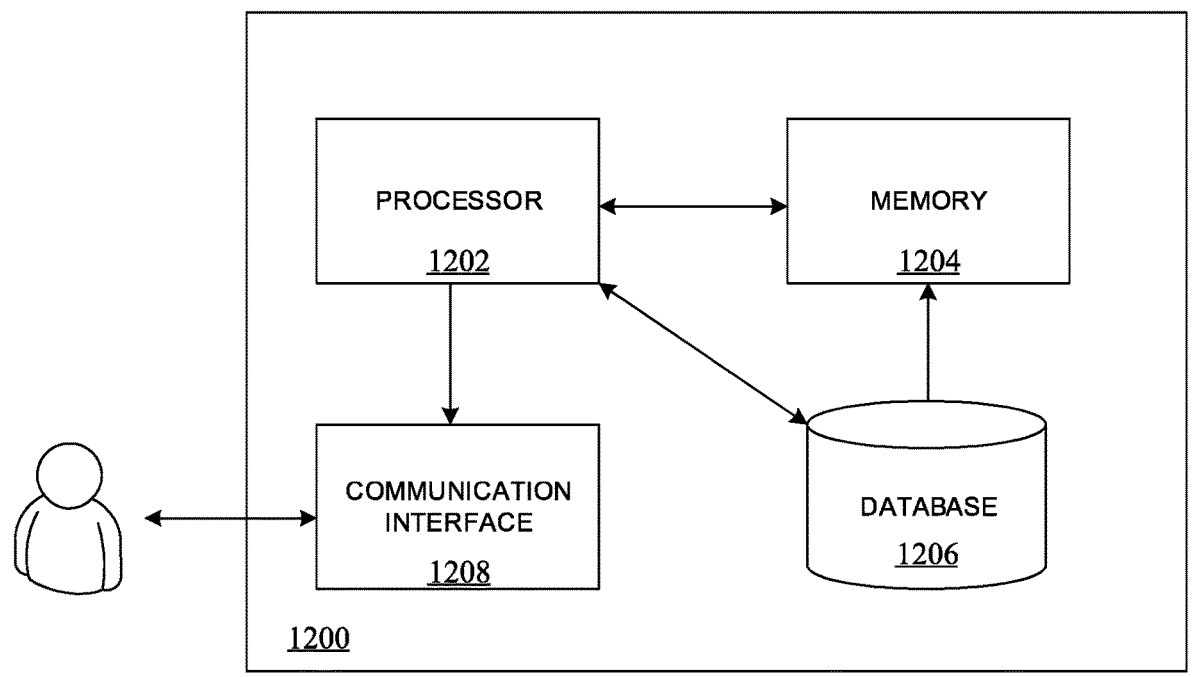
FIG. 12 is a block diagram of the security device for securing IOT devices, in accordance with some embodiments.

FIG. 12 is a block diagram of the security device 1200 for securing IOT devices in accordance with various embodiments. The security device 1200 may include a processor 1202, a memory 1204, a database 1206 and a communication interface 1208. The communication interface 1208 may be used to scan nearby area for IOT devices. Further, the communication interface 1208 may be used to connect to a secure cloud, such as the secure cloud 1102. The database 1206 may be used to store security profiles for various IOT devices detected near the security device 1200. The processor 1202 in conjunction with the memory 1204 may be configured to perform the various steps of methods 1300 and 1400 explained in conjunction with FIGS. 13 and 14.

Figure 13:
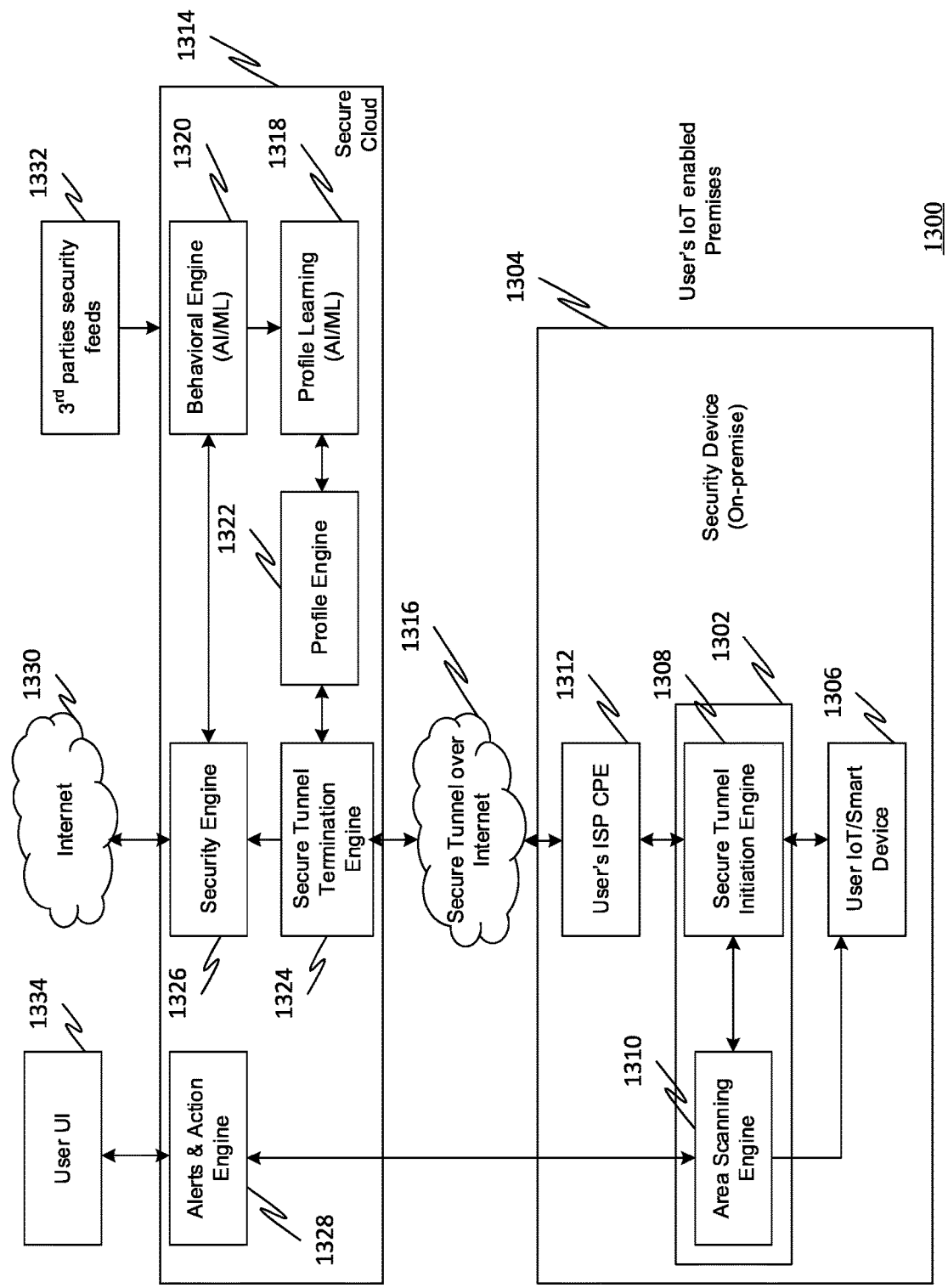
FIG. 13 is a flowchart illustrating a method for communication between a security device and a secure cloud, in accordance with some embodiments.

FIG. 13 is a block diagram of a system 1300 for communication between a security device, such as the security device 1200 and a secure cloud, such as the secure cloud 1102 in accordance with various embodiments. The system 1300 may include an on premises security device 1302, installed in an IOT enabled premises 1304. Further, the on premises security device 1302 may include a secure tunnel initiation engine 1308, and an area scanning engine 1310. Further, the area scanning engine 1310 may scan for a user IOT device 1306. Accordingly, the user IOT device 1306 may connect to the on premises security device 1302 may be connected. Further, the on premises security device 1302 may connect to a user CPE 1312. Further, the on premises security device 1302 may connect to a secure cloud 1314 over a secure tunnel 1316. Further, the secure cloud 1314 may include a behavioral engine 1320, a profile learning engine 1318, a profile engine 1322, a secure tunnel termination 1324, a security engine 1326, and an alerts and action engine 1328. Further, the secure cloud 1314 may also be connected to a user UI 1334, third party security feeds 1332, and an external network, such as the internet 1330.

Figure 14:
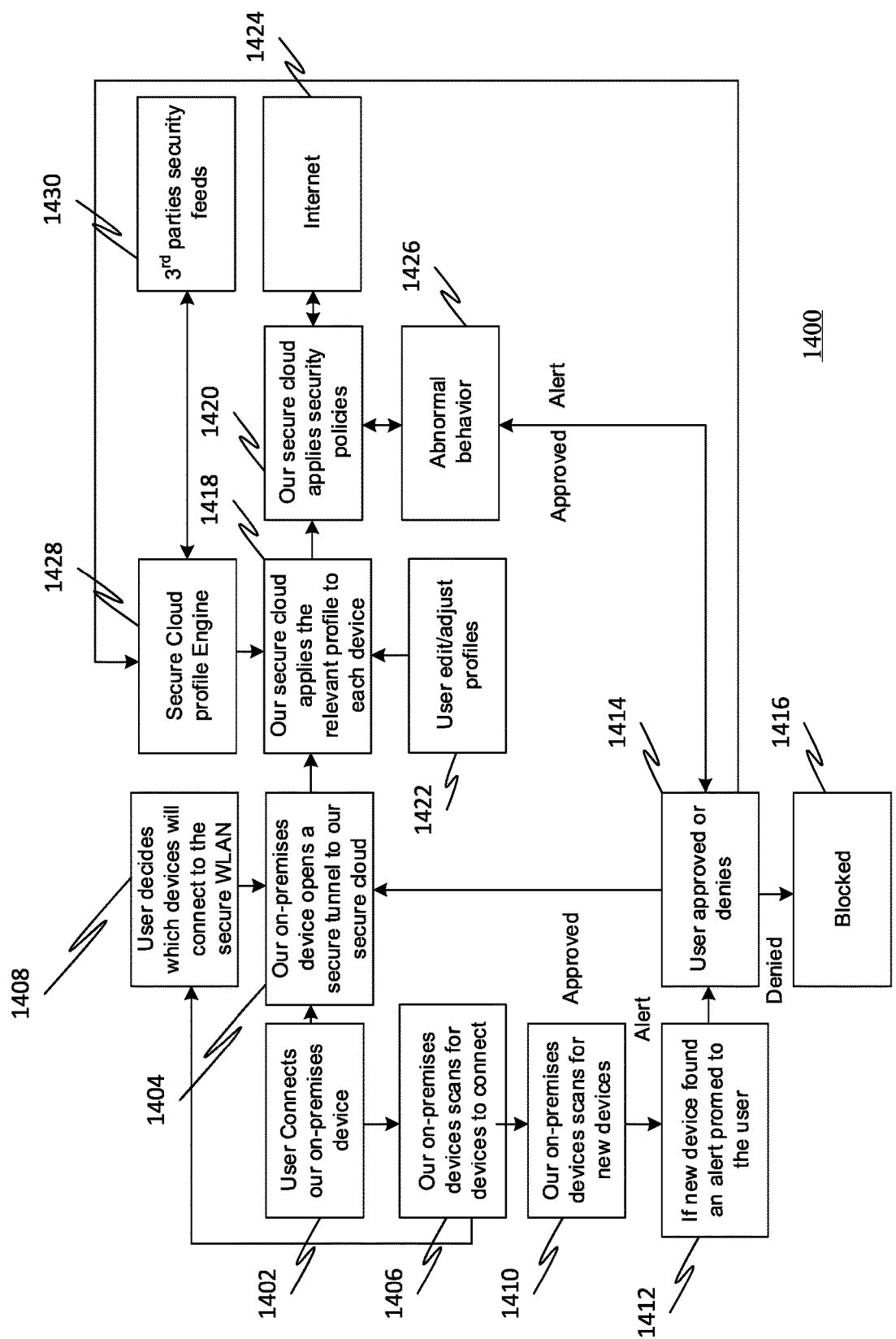
FIG. 14 is a flowchart of a method for securing IOT devices, in accordance with some embodiments.

FIG. 14 is a flowchart of a method 1400 for securing IOT devices, in accordance with various embodiments. At 1402, a user may connect a security device to a CPE provided by an ISP. At 1406, the security device may automatically connect with a secure tunnel termination engine in a secure cloud over a secure tunnel (VPN). Further, at 1406, the security device may scans for available IOT devices to connect (via WLAN). If one or more IOT devices are found, then an alerts and action engine in the secure cloud may send alert to the user. The alerts may be sent to the user via one or more of a mobile application, a chatbot, a text or a web portal. Further, ay 1408, the user may choose (on a user interface) to connect the one or more IOT devices via a secure WLAN. Further, at 1410, an area scanning engine of the security device may periodically scan for new IOT devices in the vicinity. Further, at 1412, if any new device is found an alert may be transmitted to the user. Further, at 1414, the user may allow or block the smart device. Accordingly, at 1416, a device may be blocked based on user input received at 1414. Further, at 1418, a profile engine in the secure cloud may match and applies the relevant security profiles to each device based on type (such as camera, refrigerator, and lock). Further, at 1420, relevant security policies may be applied on the one or more security devices based on the respective security profile. Further, the secure cloud profile engine 1428 may retrieve relevant security profile from third party security feeds 1430. Further, at 1422, a user may edit or adjust the security profiles. Further, at 1424, the IOT devices may be connected to an external network such as the Internet from the secure cloud through the secure tunnel. Further, at 1426, if any abnormal behavior is detected, then the alerts and action engine may transmit an alert to the user. For example, if a new connection (internal or external) is initiated to a destination not known to the security device or the secure cloud, then the alerts and action engine may send an alert to the user. Specifically, if a connection goes outside of the corresponding security profile, then the alert may be sent. Thereafter, based on the user action, the connection may be accepted or denied as in 1414. Further, if a new device tries to connect to the secure WLAN, an alert may be generated as for the user to act. Thereafter, based on the user action, the connection may be accepted or denied. Moreover, the user may at any point change passwords, check reports, check logs and edit any action taken automatically or by the user using one or more of the mobile application, the chatbot, the text, the web portal.

Figure 15:
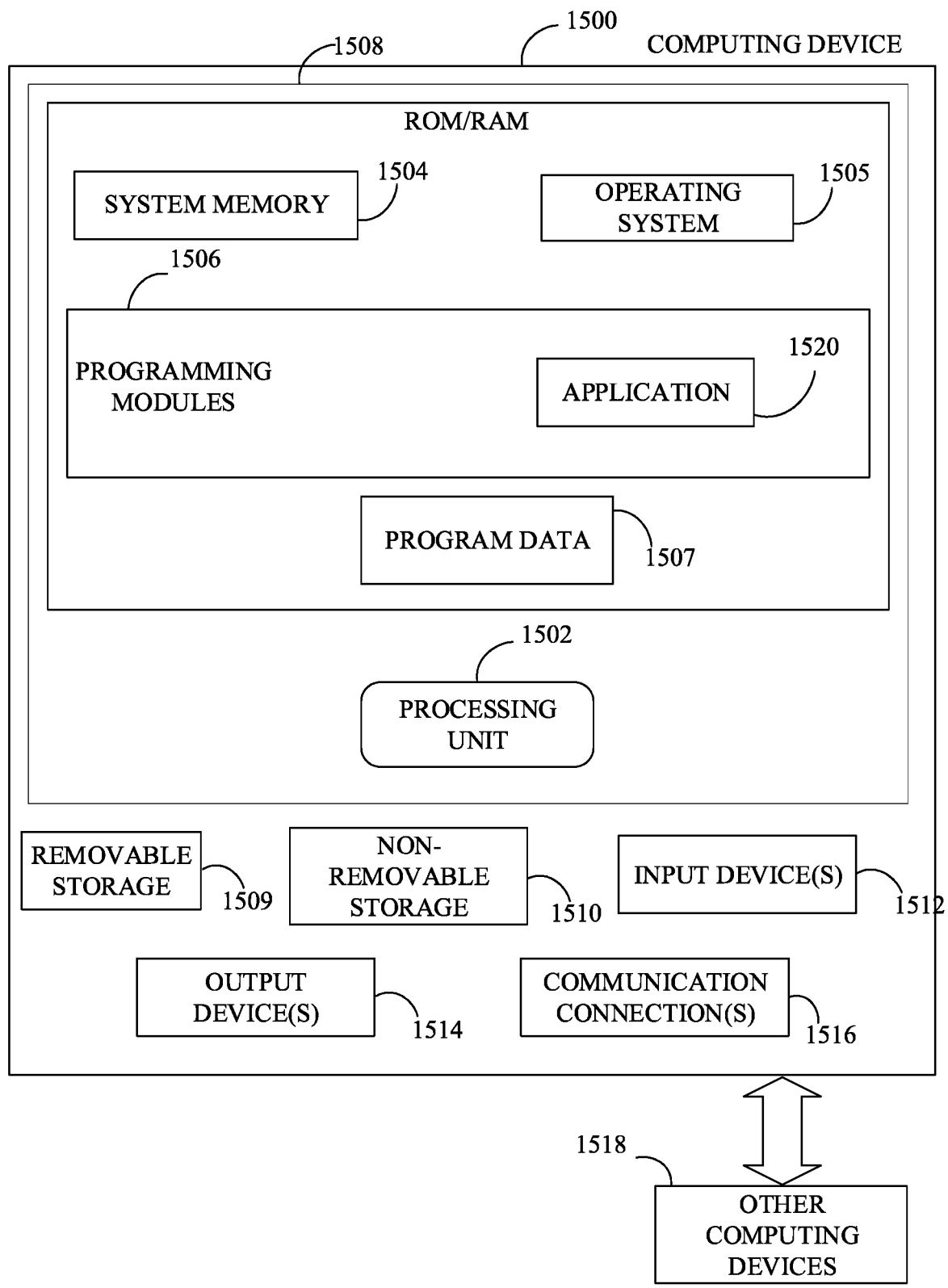
FIG. 15 is a block diagram of a computing device for implementing the methods disclosed herein, in accordance with some embodiments.

With reference to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may comprise, but is not limited to, volatile (e.g. random-access memory (RAM)), non-volatile (e.g. read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include a machine learning module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and nonvolatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520 such as a media player) may perform processes including, for example, one or more stages of methods, algorithms, systems, applications, servers, databases as described above. The aforementioned process is an example, and processing unit 1502 may perform other processes. Other programming modules that may be used in accordance with embodiments of the present disclosure may include machine learning application etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

The invention claimed is:

1. A method of providing security to INTERNET OF THINGS (IOT) devices operating in an environment, the method comprising:
   receiving, using a communication device, a plurality of security profiles associated with a plurality of IOT devices from at least one security database;
   storing, using a storage device, the plurality of security profiles;
   receiving, using the communication device, a plurality of identifiers associated with the plurality of IOT devices from a customer premises equipment (CPE);
   retrieving, using the storage device, the plurality of security profiles associated with the plurality of IOT devices based on the plurality of identifiers;
   transmitting, using the communication device, the plurality of security profiles to the CPE, wherein the CPE is configured to control communication between the plurality of IOT devices and an external communication network based on the plurality of security profiles;
   receiving, using the communication device, a plurality of instantiated security profiles from a plurality of customer premises equipment (CPE);
   receiving, using the communication device, contextual data associated with the plurality of instantiated security profiles;
   performing, using a processing device, machine learning on each of the plurality of instantiated security profiles and the corresponding contextual data;
   generating, using the processing device, at least one recommendable security profile associated with each of a context and an IOT device based on performing the machine learning; and
   storing, using the storage device, each of the at least one recommendable security profile, the context and an identifier associated with the IOT device, wherein the plurality of security profiles comprises the at least one recommendable security profile.

2. The method of claim 1 further comprising:
   receiving, using the communication device, security information from at least one third security database;
   analyzing, using the processing device, the security information; and
   generating, using the processing device, the plurality of security profiles associated with the plurality of IOT devices based on the analyzing of the security information.

3. The method of claim 1, wherein the contextual data further comprises at least one security operation performed by the plurality of CPE based on the inspecting of a plurality of communication streams associated with the plurality of CPE.

4. The method of claim 3, wherein the contextual data further comprises at least one security response associated with the plurality of CPE.

5. The method of claim 1 further comprising:
receiving, using the communication device, a plurality of communication streams corresponding to the plurality of IOT devices associated with the environment;
analyzing, using the processing device, the plurality of communication streams;
determining, using the processing device, a plurality of identifiers associated with the plurality of IOT devices based on the analyzing;
retrieving, using the storage device, the plurality of security profiles associated with the plurality of TOT devices based on the plurality of identifiers;
inspecting, using the processing device, the plurality of communication streams based on the corresponding plurality of security profiles; and
performing, using the processing device, at least one security operation based on the inspecting of the plurality of communication streams.

6. The method of claim 5 further comprising:
updating, using the processing device, the plurality of security profiles to obtain a plurality of updated security profiles based on the inspecting;
inspecting, using the processing device, the plurality of communication streams based on the plurality of updated security profiles; and
performing, using the processing device, at least one security operation based on the inspecting of the plurality of communication streams based on the plurality of updated security profiles.

7. The method of claim 5 further comprising:
receiving, using the communication device, at least one security response from at least one user device, wherein the at least one security response corresponds to at least one security operation based on inspecting of the plurality of communication streams, wherein the at least one security operation includes at least one security notification;
analyzing, using the processing device, the at least one security response;
updating, using the processing device, the plurality of security profiles to obtain a plurality of updated security profiles based on the analyzing of the at least one security response;
inspecting, using the processing device, the plurality of communication streams based on the plurality of updated security profiles; and
performing, using the processing device, at least one security operation based on the inspecting of the plurality of communication streams based on the plurality of updated security profiles.

8. The method of claim 1 further comprising:
transmitting, using the communication device, the plurality of security profiles to a user device;
receiving, using the communication device, at least one user manipulation from the user device;
updating, using the processing device, the plurality of security profiles to obtain a plurality of updated security profiles based on the at least one user manipulation;
inspecting, using the processing device, a plurality of communication streams based on the plurality of updated security profiles; and
performing, using the processing device, at least one security operation based on the inspecting of the plurality of communication streams based on the plurality of updated security profiles.

9. The method of claim 8 further comprising:
analyzing, using the processing device, the plurality of security profiles;
generating, using the processing device, a plurality of natural language (NL) based security profiles associated with the plurality of security profiles based on the analyzing of the plurality of security profiles; and
transmitting, using the communication device, the plurality of NL based security profiles to the user device.

* * * * *